(12) United States Patent
Dutta et al.

(10) Patent No.: US 12,387,012 B2
(45) Date of Patent: Aug. 12, 2025

(54) SYSTEM AND METHOD FOR IDENTITY MANAGEMENT

(71) Applicant: JIO PLATFORMS LIMITED, Gujarat (IN)

(72) Inventors: Debashis Dutta, Maharashtra (IN); Chandan Maity, Maharashtra (IN); Shivraj Dagadi, Karnataka (IN); Anish Shah, Maharashtra (IN)

(73) Assignee: JIO PLATFORMS LIMITED, Gujarat (IN)

( * ) Notice: Subject to any disclaimer, the term of this patent is extended or adjusted under 35 U.S.C. 154(b) by 0 days.

(21) Appl. No.: 18/028,456

(22) PCT Filed: Jan. 24, 2023

(86) PCT No.: PCT/IB2023/050573
§ 371 (c)(1),
(2) Date: Mar. 24, 2023

(87) PCT Pub. No.: WO2023/144687
PCT Pub. Date: Aug. 3, 2023

(65) Prior Publication Data
US 2024/0311514 A1 Sep. 19, 2024

(30) Foreign Application Priority Data
Jan. 25, 2022 (IN) .............................. 202221004234

(51) Int. Cl.
*H04L 29/06* (2006.01)
*G06F 21/64* (2013.01)
(Continued)

(52) U.S. Cl.
CPC ............ *G06F 21/64* (2013.01); *H04L 9/0825* (2013.01); *H04L 9/3247* (2013.01)

(58) Field of Classification Search
CPC ....... G06F 21/64; G06F 21/44; H04L 9/0825; H04L 9/3247; H04L 63/08; H04L 63/0823; H04W 12/06; H04W 12/069
See application file for complete search history.

(56) References Cited

U.S. PATENT DOCUMENTS 6,571,221 B1 * 5/2003 Stewart ............... H04W 12/069
705/52
9,729,537 B2 8/2017 McBride et al.
(Continued)

OTHER PUBLICATIONS

International Search Report, PCT/IB2023/050573, mailed Apr. 20, 2023, Total Pages 03.

*Primary Examiner* — Malcolm Cribbs
(74) *Attorney, Agent, or Firm* — Procopio, Cory, Hargreaves & Savitch LLP

(57) ABSTRACT

The present disclosure provides a system and a method for Public Key Infrastructure (PKI) enabled Subscriber Information Management (SIM) for digital identity management. The method includes receiving a request for issuance of a digital identity for the SIM associated with a user. Responsive to an affirmative verification of a set of documents, the method includes transmitting user information determined from the verified set of documents and a predetermined signal to a Certification Authority (CA). Further, the digital identity is generated upon receiving a Certifying Signing Request (CSR) from an end-entity and a second predetermined signal from a verification source. The generated digital identity is transmitted to the end-entity and to the SIM via a middleware.

18 Claims, 24 Drawing Sheets

(51) Int. Cl.
 *H04L 9/08* (2006.01)
 *H04L 9/32* (2006.01)

(56) References Cited

U.S. PATENT DOCUMENTS

| | | | |
|---|---|---|---|
| 2010/0109835 A1* | 5/2010 | Alrabady | H04L 63/0823 340/5.2 |
| 2015/0295892 A1* | 10/2015 | Fox | H04L 63/0823 726/15 |
| 2016/0007188 A1 | 1/2016 | Wane | |
| 2017/0250816 A1* | 8/2017 | Popa | G06F 21/62 |
| 2018/0109947 A1 | 4/2018 | Kim et al. | |
| 2021/0320924 A1* | 10/2021 | Omori | G06F 21/31 |
| 2023/0007480 A1* | 1/2023 | Tian | H04W 12/043 |

* cited by examiner

SYSTEM AND METHOD FOR IDENTITY MANAGEMENT

RESERVATION OF RIGHTS

A portion of the disclosure of this patent document contains material, which is subject to intellectual property rights such as, but are not limited to, copyright, design, trademark, Integrated Circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to identity management. More particularly, the present disclosure relates to a system and a method to facilitate public key infrastructure (PKI) enabled subscriber identification module (SIM) for identity management.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Public Key Infrastructure (PKI) may be considered as a mechanism that has been accepted in practice by various business organizations to achieve high level of security assurance. The PKI mainly pertains to a policy based implementation of hardware, software, and procedures that enable to create, manage, use, store, distribute, and revoke digital certificates and management of public-key encryption. In a typical PKI framework, there are two complementary keys which are mathematically linked, wherein one key is called as private key that remains secure inside a hardware dongle or chip and the second one is called as public key. Any piece of information or data which is encrypted by any one of the keys in the key pair, may only be decrypted by another key in the key pair. The PKI framework enables to maintain confidentiality, authentication, integrity, and non-repudiation of data. The degree of security of the PKI can be further increased by updating or increasing length size and algorithm types pertaining to the key.

To achieve all the attributes of security in most of the common segments of user centric applications such as communication, privacy, storage, authentication, verification, claim, and the like, all the end-users must have a dedicated PKI key pair. However, the security concerns may still exist in a typical PKI framework, especially in scenarios when the key pair/other sensitive data may need to be shared/saved such as, for example, in local memory, third party servers, and other such components. Further, the key store mechanism of PKI may also require a dedicated hardware system with sufficient hardware security. For example, hardware dongles such as smart cards and universal serial bus (USB) tokens may be commercially available to facilitate the PKI to enable subsequent digital signature. However, such hardware dongles may have multiple issues when implemented for mass applications. Some of the limitations may include cost of the hardware, size of the hardware, integration of hardware with various type of applications, need of securing extra pieces of hardware, lack of direct integration with machines or connected devices, and other such issues. Thus, the conventional techniques may tend to compromise either on flexibility or costs of PKI adoption or implementation.

There is, therefore, a need in the art to provide an effective system and a method that can facilitate increase in security, while minimizing system dependency/costs in implementation of PKI based framework for identity management.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for Public Key Infrastructure (PKI) enabled Subscriber Identification Module (SIM) for digital identity management. The system includes one or more processors operatively configured to a service operator, and a memory operatively coupled to the one or more processors. The memory includes processor-executable instructions, which on execution, cause the one or more processors to receive a request for issuance of a digital identity for the SIM associated with a user. The system verifies a set of documents, where the set of documents are collected based on a request raised by the service operator. Responsive to an affirmative verification of the set of documents, the system transmits user information determined from the verified set of documents and a predetermined signal to a Certification Authority (CA). The CA maintains demographic information of the user. The system generates the digital identity for the user based on a Certifying Signing Request (CSR), where the digital identity is linked with the demographic information of the user. The digital identity is generated upon receiving the CSR from an end-entity, and a second predetermined signal from a verification source. The system further transfers the generated digital identity to the end-entity and to the SIM via a middleware. The transferred digital identity is stored in the SIM.

In an embodiment, the one or more processors are configured to authenticate the user using the stored digital identity in the SIM, where the stored digital identity is deleted upon the user issuing a request to revoke the generated digital identity.

In an embodiment, the middleware is a set of instructions secured by digital signatures of the CA.

In an embodiment, CSR template for the CSR is prepared by creating an asymmetric key pair inside the SIM, and performing an asymmetric encryption of the asymmetric key pair.

In an embodiment, the one or more processors are configured to collect the set of documents using at least one of an online medium and an offline medium.

In an embodiment, the SIM transmits, via a first link, information to a remote server, and to a predetermined application via a second link, where the information is relayed to the CA.

In an embodiment, the SIM includes a secured set of instructions that are accessed remotely via an Over-The-Air (OTA) server.

In an embodiment, the service operator acts as a Registration authority (RA) and is connected to a sub-CA or a root CA, where the user communicates with the service operator through at least one of the sub-CA or the root CA.

In an embodiment, the SIM includes a Radio Interface Layer (RIL) and Operating System (OS) Application Programming Interface (API) block, a Global Platform (GP) communication security block, and an Application Protocol Data Unit (APDU) block.

In an embodiment, the SIM comprises one or more of security key pairs and digital certificates for establishing the digital identity.

In an embodiment, the service operator issues the digital identity upon receiving consent from the CA.

In an embodiment, the CSR is sent to the CA. The CSR is issued upon the user providing a Personal Identification Number (PIN), where the CSR is associated with the request for the issuance of the digital identity.

In another aspect, the present disclosure relates to a method for PKI enabled SIM for digital identity management. The method includes receiving, by one or more processors operatively configured with a service operator, a request for issuance of a digital identity for the SIM associated with a user. The method includes verifying, by the one or more processors, a set of documents. The set of documents are collected based on a request raised by the service operator. Responsive to an affirmative verification of the set of documents, the method includes transmitting, by the one or more processors, user information determined from the verified set of documents and a predetermined signal to a CA. The method includes generating, by the one or more processors, the digital identity for the user based on a CSR. The digital identity is linked with the demographic information of the user, and the digital identity is generated upon receiving the CSR from an end-entity, and a second predetermined signal from a verification source. The method includes transferring, by the one or more processors, the generated digital identity to the end-entity and to the SIM via a middleware, where the transferred digital identity is stored in the SIM.

In another aspect, the present disclosure relates to a user equipment (UE) for PKI enabled SIM for digital identity management. The UE includes one or more processors communicatively coupled to a system. The system includes a processor configured to receive a request for issuance of a digital identity for the SIM associated with a user. The system verifies a set of documents, where the set of documents are collected based on a request raised by a service operator. Responsive to an affirmative verification of the set of documents, the system transmits user information determined from the verified set of documents and a predetermined signal to a CA. The CA maintains demographic information of the user. Further, the system generates the digital identity for the user based on a CSR, where the digital identity is linked with the demographic information of the user. The digital identity is generated upon receiving the CSR from an end-entity, and a second predetermined signal from a verification source. The system further transfers the generated digital identity to the end-entity and to the SIM via a middleware. The transferred digital identity is stored in the SIM.

In another aspect, the present disclosure relates to a SIM card operatively configured for a UE for digital identity management. The SIM card includes one or more processors communicatively coupled to a system, where the system includes a processor configured to receive a request for issuance of a digital identity for the SIM card associated with a user. A set of documents are verified, where the set of documents are collected based on a request raised by a service operator. In response to an affirmative verification of the set of documents, user information determined from the verified set of documents and a predetermined signal is transmitted to a CA, where the CA maintains demographic information of the user. The digital identity for the user is generated based on a CSR. The digital identity is linked with the demographic information of the user, and the digital identity is generated upon receiving the CSR from an end-entity, and a second predetermined signal from a verification source. The generated digital identity is transferred to the end-entity and to the SIM via a middleware, where the transferred digital identity is stored in the SIM.

OBJECTS OF THE PRESENT DISCLOSURE

Some of the objects of the present disclosure, which at least one embodiment herein satisfies are as listed herein below.

It is an object of the present disclosure to provide an effective system and a method that can facilitate identity management in various digital transactions/interactions between individuals and/or machines/devices.

It is an object of the present disclosure to provide an effective system and a method that can facilitate identity management in public key infrastructure (PKI) implementation.

It is an object of the present disclosure to provide an effective system and a method that may prevent the need to share/store sensitive information in third party servers or other insecure hardware/service.

It is an object of the present disclosure to provide an economical system and a method that may significantly improve security, while minimizing system dependency/costs in implementation of PKI based framework for identity management.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
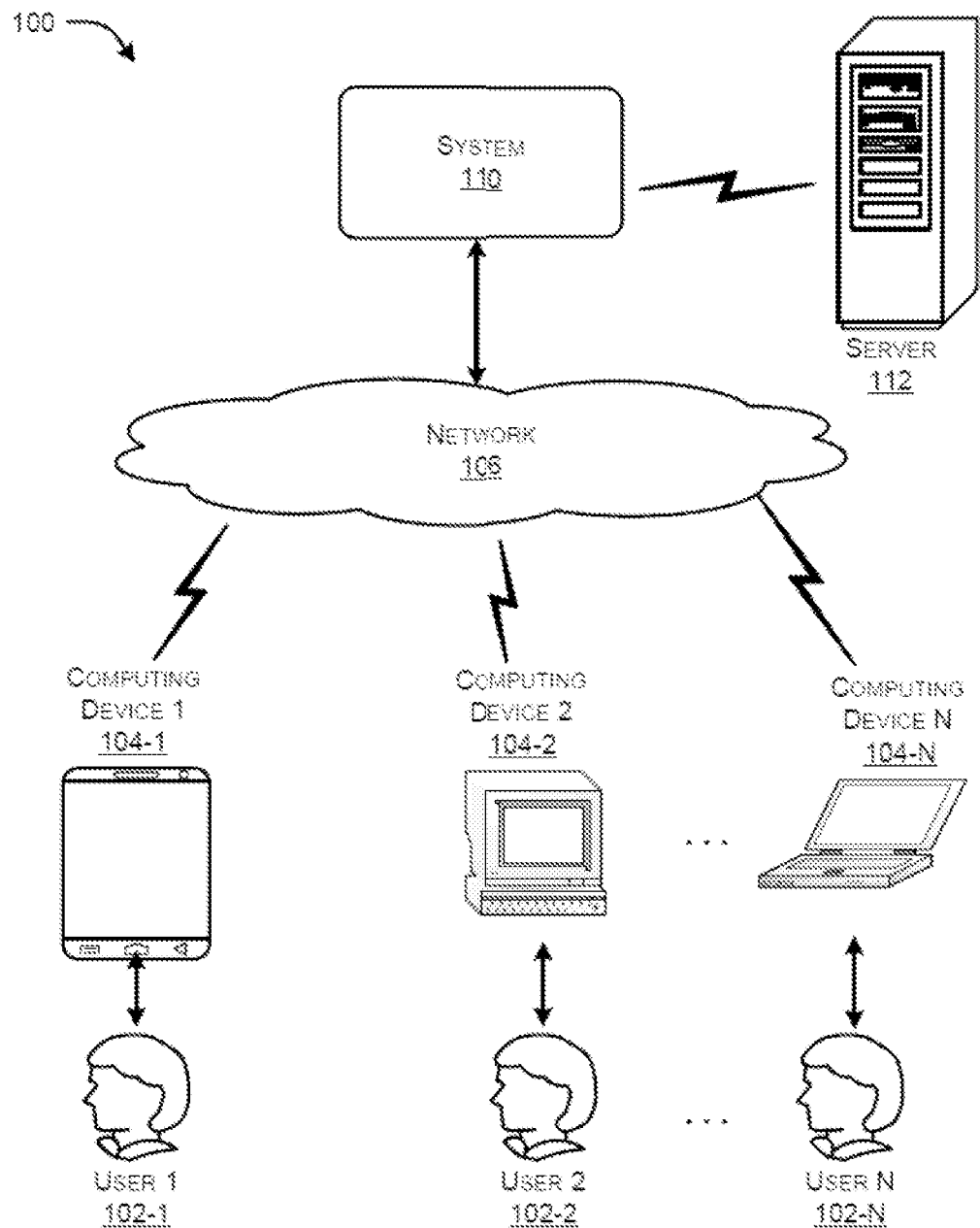
FIG. 1 illustrates an exemplary network architecture (100) in which or with which a proposed system may be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a system and a method to facilitate public key infrastructure (PKI) enabled subscriber identification module (SIM) for identity management. The present disclosure is related to security and management of identity of individuals and/or hardware components of the system to access various segments of the digital world leveraging existing telecom and internet technology (IT) infrastructure. The present disclosure may cover aspects including, but not limited to, universal identity management with root of trust managed by central authority, solution and system architecture of the framework, democratization of digital signature and its usage in real life applications. The real life applications may include, but not be limited to, digital signature, offline e-wallet, securing and storage of personal data, secure-communication using mutual authentication, @ and enabling trustable services such as, for example, Government to citizen (G2C) services. Various other applications, which need security framework and implemented in daily life activities, may be possible to be supported/executed using the system and method of the present disclosure.

In digital services, for improved security and to ensure repudiation or validity of a digital transaction, it may be important to consider aspects such as i) "authenticity of the sender" and ii) "authenticity of the recipient." However, the conventional techniques mainly focus on the second attribute i.e. "authenticity of the recipient" but the verification of authenticity of sender may not be properly addressed digitally. These techniques may mainly cater to man-machine interaction where man is the sender and recipients are a machine or a server. The authenticity of the sender may be checked or verified by various alternate manual means such as one time password (OTP), password, captcha, and other methods, and the authenticity of the recipient (machine or server) may be assessed via adoption of a secure channel and digital signature. However, unlike man-machine interface, if both sender and recipients may be machines (hereinafter referred to as device or devices), then it may be more challenging to establish the authenticity of the sender in case of digital communication. The presence or identity of the sender may be altered, claimed, and proxied by another machine or human either intentionally or unintentionally and it may be challenging to detect it, especially on a real-time basis. Hence, the adoption of identity of the sender may be very important in machine-to-machine communication.

FIG. 1 illustrates an exemplary network architecture (100) in which or with which a proposed system (110) may be implemented, in accordance with an embodiment of the present disclosure.

Referring to FIG. 1, the network architecture (100) may include one or more computing devices (104-1, 104-2 . . . 104-N) associated with one or more users (102-1, 102-2 . . . 102-N) deployed in an environment. A person of ordinary skill in the art will understand that one or more users (102-1, 102-2 . . . 102-N) may be individually referred to as the user (102) and collectively referred to as the users (102). Further, a person of ordinary skill in the art will understand that one or more computing devices (104-1, 104-2 . . . 104-N) may be individually referred to as the computing device (104) and collectively referred to as the computing devices (104).

In an embodiment, each computing device (104) may interoperate with every other computing device (104) in the network architecture (100). In an embodiment, the computing devices (104) may be referred to as a user equipment (UE). A person of ordinary skill in the art will appreciate that the terms "computing device(s)" and "UE" may be used interchangeably throughout the disclosure.

In an embodiment, the computing devices (104) may include, but are not limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device (104) with wireless communication capabilities, and the like. In an embodiment, the computing devices (104) may include, but are not limited to, any electrical, electronic, electro-mechanical, or an equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device (104) may include one or more in-built or externally coupled accessories including, but not limited to, a visual aid device such as camera, audio aid, a microphone, a keyboard, and input devices for receiving input from the user (102) such as touch pad, touch enabled screen, electronic pen, and the like.

In an embodiment, the computing devices (104) may include smart devices operating in a smart environment, for example, the IoT system. In such an embodiment, the computing devices (104) may include, but are not limited to, smart phones, smart watches, smart sensors (e.g., mechanical, thermal, electrical, magnetic, etc.), networked appliances, networked peripheral devices, networked lighting system, communication devices, networked vehicle accessories, smart accessories, tablets, smart television (TV), computers, smart security system, smart home system, other devices for monitoring or interacting with or for users (102)

and/or places, or any combination thereof. In an embodiment, the computing devices (104) may include one or more of the following components: sensor, radio frequency identification (RFID) technology, GPS technology, mechanisms for real-time acquisition of data, passive or interactive interface, mechanisms of outputting and/or inputting sound, light, heat, electricity, mechanical force, chemical presence, biological presence, location, time, identity, other information, or any combination thereof.

A person of ordinary skill in the art will appreciate that the computing devices (104) may include, but not be limited by, intelligent, multi-sensing, network-connected devices, that can integrate seamlessly with each other and/or with a central server or a cloud-computing system or any other device that is network-connected.

A person of ordinary skill in the art will appreciate that the computing devices or UEs (104) may not be restricted to the mentioned devices and various other devices may be used.

Referring to FIG. 1, the computing devices (104) may communicate with the system (110), for example, a digital identity system, through a network (106). In an embodiment, the network (106) may include at least one of a Fourth Generation (4G) network, a Fifth Generation (5G) network, or the like. The network (106) may enable the computing devices (104) to communicate between devices (104) and/or with the system (110). As such, the network (106) may enable the computing devices (104) to communicate with other computing devices (104) via a wired or wireless network. The network (106) may include a wireless card or some other transceiver connection to facilitate this communication. In another embodiment, the network (106) may be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

Further, the system (110) may be operatively coupled to a server (112). In an embodiment, the computing devices (104) may be capable of data communications and information sharing with the server (112) through the network (106). In an embodiment, the server (112) may be a centralized server or a cloud-computing system or any device that is network connected.

The present disclosure may overcome the above mentioned challenges in several ways. In an embodiment, the system (110) of the present disclosure may evaluate a digital identity of all hardware/machines/devices which are connected over the network (106) by associating digital certificates with all connected hardware/machines/devices or IoT devices. It may be possible that the digital identity may be governed by a central or certification authority (CA) or its approved partners. The digital identity may be similar to digital signature issued to individuals. As a possible extended application, the present disclosure may be implemented in existing certifying authorities by government/public sectors/private sectors. The implementation of the present system and methods may not only increase the data security in machine-machine (device-device) communication, but may also create a large repository of trusted device that can be accepted for interoperable communication in near future.

In an alternate embodiment, existing infrastructure may be enhanced or scaled up with distributed authority sharing mechanism. In an example, leveraging the existing eco-system of certificate authority/certification authority (CA), sub-CA hierarchy, the digital signature holding users may be allowed to further generate and issue corresponding chain of certificates to devices under supervision or control of the users. In an example embodiment, the accountability may also be shared with users (102) with controlled privileged option to create independent certificate verification and revocation eco-system. In an embodiment, connected devices may be enabled to use respective identity/digital signature to establish a secure channel that cannot be breached and a true mutual authentication process (sender and recipient identification) may be provided. In another embodiment, it may be possible to encrypt all the data in remote communication to ensure no security breach may happen either due to manual or automatic attacks. Several other features/aspects may be possible.

In another embodiment, to create a viable eco-system, few hardware inclusions may be implemented in the communication network (106) as well as with end hardware devices or nodes. The hardware inclusion may pertain to an end node identity and/or communication channel identity. In some embodiments, along with digital identity, the end node identity and/or the communication channel identity may be necessary to facilitate communication channel security and data security.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2A:
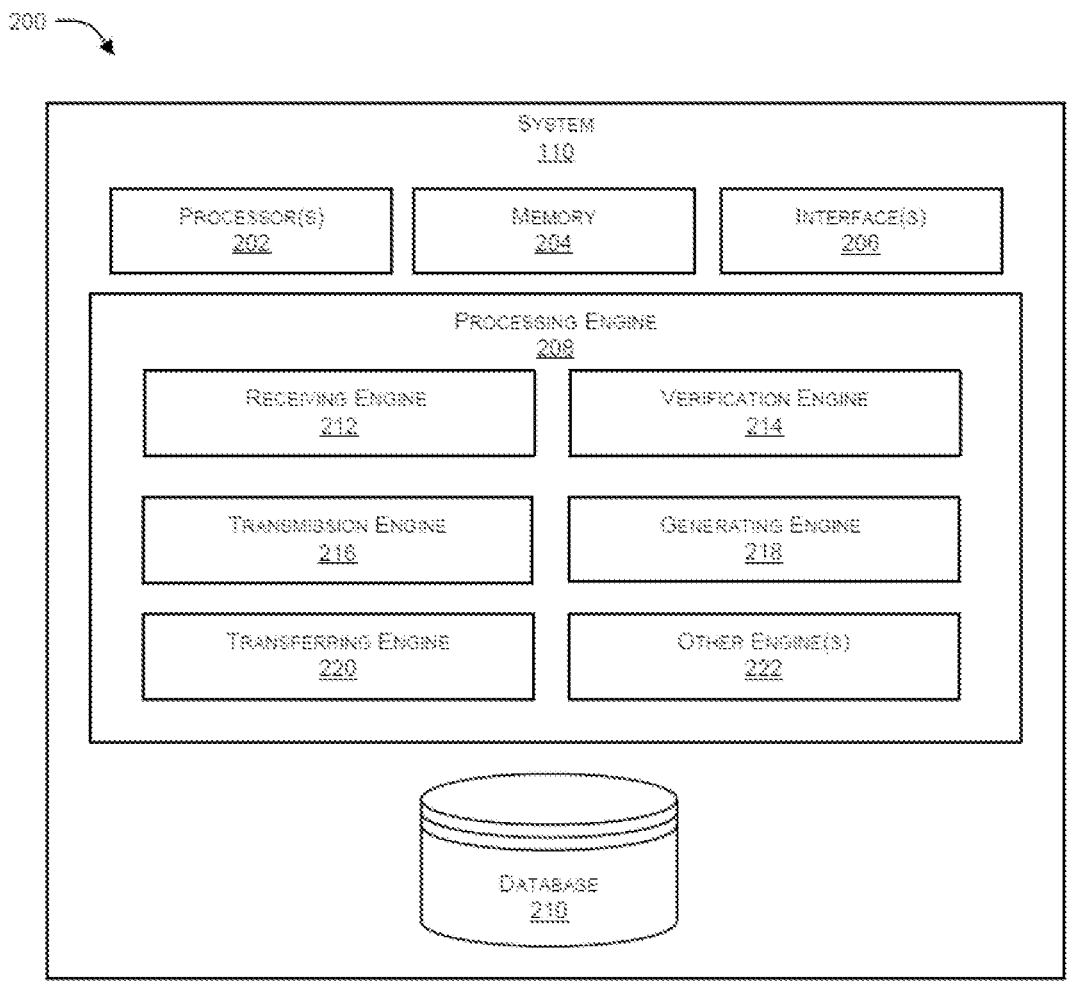
FIG. 2A illustrates an exemplary representation (200) of the proposed system for Public Key Infrastructure (PKI) enabled Subscriber Identification Module (SIM) for digital identity management, in accordance with an embodiment of the present disclosure.

FIG. 2A illustrates an exemplary representation (200) of the proposed system (110) for public Key Infrastructure (PKI) enabled Subscriber Identification Module (SIM) for digital identity management, in accordance with an embodiment of the present disclosure.

For example, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as Random-Access Memory (RAM), or non-volatile memory such as Electrically Erasable Programmable Read-only Memory (EPROM), flash memory, and the like.

In an embodiment, the system (110) may include an interface(s) (206). The interface(s) (206) may comprise a variety of interfaces, for example, interfaces for data input and output devices, referred to as input/output (I/O) devices, storage devices, and the like. The interface(s) (206) may facilitate communication for the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (205) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may include the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry. In an aspect, the database (210) may comprise data that may be either stored or generated as a result of functionalities implemented by any of the components of the processor (202) or the processing engines (208).

In an embodiment, the processing engine (208) may include engines that receive data from one or more computing devices via a network such as the computing devices (104) via the network (106) (e.g., via the Internet) of FIG. 1, for digital identity. In an embodiment, the analyzed data may be stored at the database (210). In an embodiment, the processing engine (208) may include one or more modules/engines such as, but not limited to, a receiving engine (212), a verification engine (214), a transmission engine (216), a generating engine (218), a transferring engine (220), and other engine(s) (222).

Referring to FIG. 2A, the database (210) may store the data, i.e., a set of data parameters corresponding to events triggered at the one or more computing devices (104) in the network (106). In an embodiment, the database (210) may or may not reside in the system (110). In an embodiment, the system (110) may be operatively coupled with the database (210).

In an exemplary embodiment, the set of data parameters may include, but is not limited to, data indicating which computing devices (104) are active, which computing devices (104) are most active, the times at which individual computing devices (104) are most active, and location of individual computing devices (104), information indicating communications occurring between computing devices (104), etc. The set of data parameters may include, but is not limited to, information relating to which users such as the users (102) of FIG. 1 are interacting, how frequently users (102) are interacting with the computing devices (104), duration of such interactions, time period of the interactions, etc.

By way of example but not limitation, the one or more processor(s) (202) may detect when an event(s) is triggered at the one or more computing devices (104) by the one or more users (102). In an embodiment, this detection may occur, for example, by analyzing microphone signals, detecting wireless signals, detecting an internet protocol (IP) address of a received signal, detecting operation of one or more computing devices (104) within a time window, or the like. Moreover, the one or more processor(s) (202) may include image recognition technology or the like to identify particular occupants or objects or users.

Further, in an embodiment, the one or more processor(s) (202) of the system (110) may cause the receiving engine (212) to receive a request for issuance of a digital identity for the SIM associated with a user (102), where the MNO (interchangeably used as service operator herewith) issues the digital identity upon receiving a consent from a CA.

In an embodiment, the one or more processors (202) of the system (110) may verify a set of documents, where the set of documents are collected based on a request raised by the service operator.

Responsive to an affirmative verification of the set of documents, in an embodiment, the one or more processors (202) of the system (110) may transmit user information determined from the verified set of documents and a predetermined signal to the CA. The CA maintains demographic information of the user.

In an embodiment, the one or more processors (202) of the system (110) may send a Certifying Signing Request (CSR) to the CA, where the CSR is issued upon the user providing a Personal Identification Number (PIN). The CSR is associated with the request for generation of the digital identity. Further, a CSR template for the generated CSR is prepared by creating an asymmetric key pair inside the SIM and performing an asymmetric encryption of the asymmetric key pair.

In response to sending the CSR, in an embodiment, the one or more processors (202) of the system (110) may generate the digital identity for the user. The digital identity is linked with the demographic information of the user, where the digital identity is generated upon receiving the CSR from an end-entity, and a second predetermined signal from a verification source.

In an embodiment, the one or more processors (202) of the system (110) may transfer the generated digital identity to the end-entity and to the SIM via a middleware, where the transferred digital identity is stored in the SIM. The user is authenticated using the stored digital identity in the SIM. The stored digital identity is deleted upon the user issuing a request to revoke the generated digital identity.

A person of ordinary skill in the art will appreciate that the exemplary representation (200) may be modular and flexible to accommodate any kind of changes in the system (110). In an embodiment, the data may get collected meticulously and deposited in a cloud-based data lake to be processed to extract actionable insights. Therefore, the aspect of predictive maintenance can be accomplished.

Figure 2B:
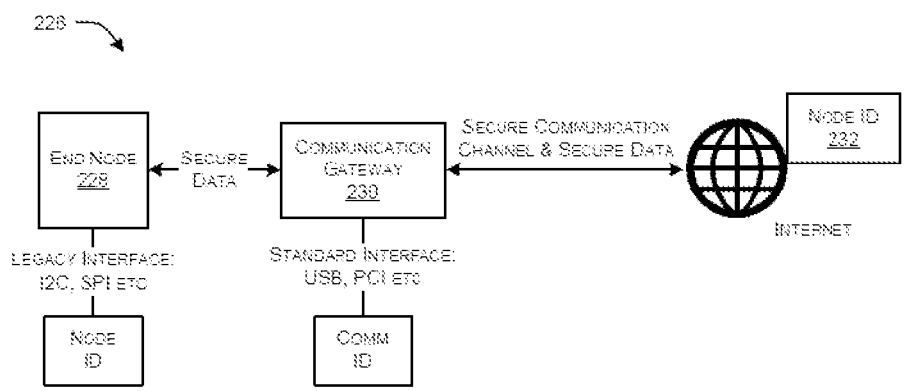
FIG. 2B illustrates an exemplary architecture (226) in which or with which the embodiments of the present disclosure may be implemented, in accordance with an embodiment of the present disclosure.

FIG. 2B illustrates an exemplary architecture (226) in which or with which the embodiments of the present disclosure may be implemented. As shown in FIG. 2B, a typical network may include one or more end nodes/devices (228) connected to a network (232) via a communication gateway (230) that enables a secure communication channel and security of data. These end nodes/devices (228) may be hardware modules having fundamental attributes such as digital identity (ID). Along with digital ID, security may be enabled in various aspects or by implementation of various corresponding attributes in transmission channel and data packet level. For example, as per the disclosed system, one attribute may be an end node identity (228) (shown as Node ID in FIG. 2B). In reference to the end node identity, generic hardware module may be added with almost all kinds of machines with various kinds of legacy interfaces. The fundamental properties pertaining to module related to end node identity may include, but not limited to, at least one of the following features:

Unique digital certificate issued by CA or a local body (owner/human/group of people) who has a valid Digital Certificate issued by the CA Encryption and Decryption of data with industry standard asymmetric encryption-based security (Rivest, Shamir, Adleman (RSA)/Elliptical curve cryptography (ECC))

No computational overhead to existing hardware device except the firmware upgrade Minimal hardware foot-print addition Addition of very minimal power consumption Supports all standard legacy embedded interfaces for communication (SPI, I2C, etc.)

In another embodiment, another attribute may be communication channel identity (shown as Comm ID (230) in FIG. 2B). The characteristics of module pertaining to communication channel identity may include, but not be limited to, at least one of the features:

Unique digital certificate issued by the CA

Add digital signature to each client/server communication in the network (232). Hence, it will allow all devices to participate in true mutual authentication for secure sockets layer (SSL) or transport layer security (TLS) layer (in contrast of present practice of only server authentication)

No computational overhead to existing hardware modules except the firmware upgrade Minimal hardware foot-print addition as internal or external attachments Supports all standard enterprise interfaces for communication (USB 2.0/3.0, PCI, etc.)

Figure 2C:
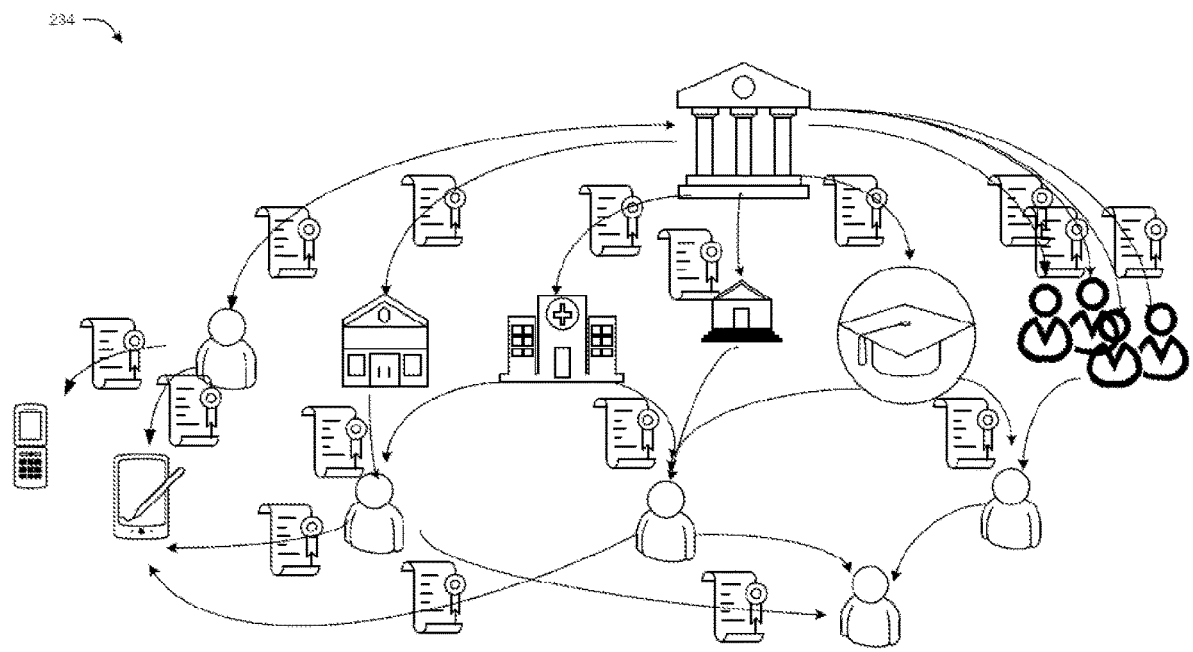
FIG. 2C illustrates a logical map representation (234) for creation and distribution of digital identity (ID), in accordance with an embodiment of the present disclosure.

FIG. 2C illustrates a logical map representation (234) for creation and distribution of digital ID, in accordance with an embodiment of the present disclosure. In an embodiment, root of trust may be taken by a CA of a governance system. The CA may supervise various authorized establishments such as, for example, police-station, hospital, financial institution or bank, educational institutions, and other such institutions that can avail digital certificates from the CA. The various authorized establishments may be further authorized to create or assign digital identity to other entities that may be human or machine/device. It may be appreciated that the present disclosure may not be limiting the authorization ability to mention legal establishments only, but the present systems and methods may also enable a user or a group of users (authorized entities having received the digital identity) to assign digital ID for machine/devices or humans. In an embodiment, multiple entities may together participate to create and provide the digital ID for other entities. For example, the police station and hospital together may create and assign a digital ID for a citizen who can take part with another citizen to create a digital ID for a machine/device. In another case, hospitals, banks, and educational institutions may take part together to create digital ID of a citizen. It may be appreciated that the entities/authorities mentioned may only be exemplary and other embodiments may be possible for creation and distribution of digital ID. It may also be appreciated that the creation and distribution of digital ID may also depend on regulations/laws in a specific jurisdiction. In an embodiment, the mentioned architecture may describe a technical representation of digital ID creation and the legal framework may be applied on top of this architecture to draw the limitation and validity of the digital ID. In an example embodiment, for a machine ID, there may be multiple IDs linked such as, for example, manufacturer of the device, service provider of the device, user/owner who operates the device, and other associated entities. It may be possible that all or some of the mentioned entities may take part to create a new digital ID of device(s). It may also be possible that individual IDs may take part in the digital world during communication to other entities. It may be appreciated that authorizing multiple entities to assign digital ID to other entities may need various different infrastructure or instances of CA, which may not be described herein but may be possible to be included within the scope of the present disclosure.

In an embodiment, the present disclosure may provide a solution that may be entirely based on PKI framework, where the identity of any entity may be created by an authorized person or organization. Unlike the conventional framework, in the present proposed system, individuals/entities (having digital identity) may be capable to create identity i.e. to issue certificates to other users/entities or citizens requiring digital certificate or identity, depending on the governing authority. For example, in case of a new-born baby or a child, the certificate for digital identity may be created by an entity citizen (who already possess a digital certificate), but the certificate may be signed by specific authorized entities (authorized for example, by the Government) such as, doctor, hospital authority, police station, schools, district magistrate, parents, and other entities may be treated as valid certificate. In some embodiments, the present disclosure may provide a PKI framework in which obtaining a digital certificate (also referred to as digital identity) from the authorized system or government may be mandatory to ensure improved security. Various other embodiments may be possible.

Figure 3:
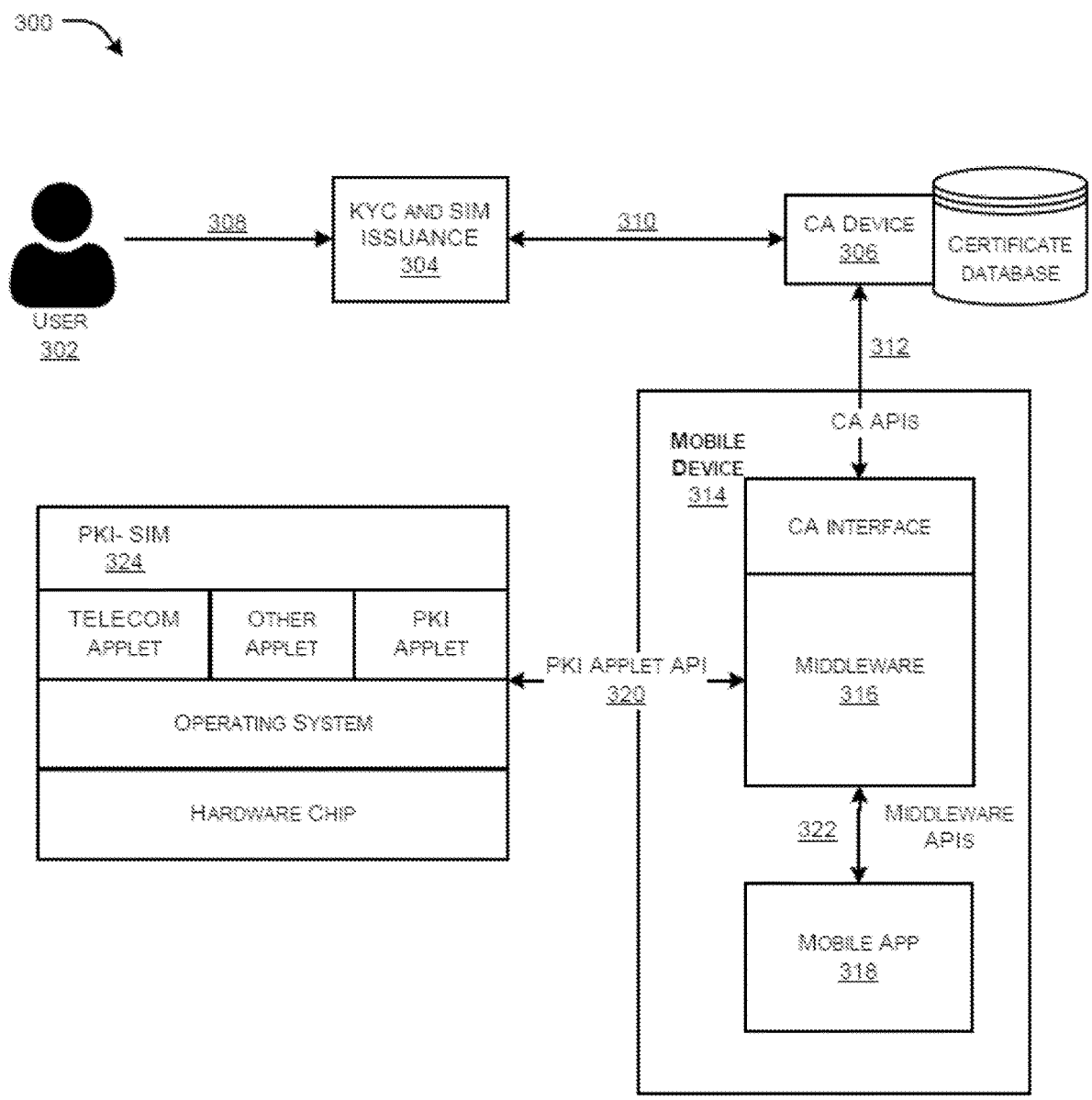
FIG. 3 illustrates a block diagram representation (300) showing an exemplary system for creation and distribution of digital ID, in accordance with an embodiment of the present disclosure.

FIG. 3 illustrates a block diagram representation (300) showing an exemplary system for creation and distribution of digital ID, in accordance with an embodiment of the present disclosure. In an embodiment, the system (110) may implement a PKI enabled SIM as a security device including various security components such as, for example, key pairs, digital certificates (used as digital identity), which may also enable digitally signing of any data. In another embodiment, the exemplary PKI enabled SIM may also be used by a valid authorizer/entity/individual to issue a certificate for other entities/individuals/devices. The PKI enabled SIM may be coupled/connected with any mobile devices/computing devices such as, for example, mobile phone or mobile phone operating system (OS) as well as to other devices in a network to interact/enable digital transaction with specific entities to complete various tasks.

As shown in FIG. 3, a user (entity/individual) or a subscriber (302) may seek for digital signature or digital identity. In an example embodiment, the user (entity/individual) or the subscriber (302) may request for digital signature or digital identity to a service operator issuing SIM cards. In this example, the present architecture may enable the service operator to issue digital certificate subject to authorization from governing authorities or CA. In an embodiment, to issue digital certificate, specific information or demographic credentials of the user (302) may be collected, which may include collection/verifying information by protocol of know your customer (KYC) (as shown in block 304). In an embodiment, the service operator may enable collection of all data/datasets from the user (302) if SIM card and digital certificate are issued together. In an alternate embodiment, if SIM card is already possessed by the user (302) and if the user (302) wants to avail the digital certificate, the service operator/MNO may collect only additional information or documents. It may be appreciated that the type of data and method of data collection may vary based on jurisdiction/location/country/region. In an embodiment, a communication channel (308) may be enabled for user data collection, wherein the channel may be online, offline, or both based on availability of medium and occupational process requirement.

The MNO may verify the required documents (or only additional documents) and once the user document verification process is completed, corresponding user information may be sent to CA infrastructure/device (shown in 306) via link (as shown in 310) along with a positive indication to the CA device (306) where it preserves user's demographic information. The indication may be important for taking a decision regarding generation of the digital certificate. In an embodiment, the process may be initiated by the user (302) only. In the next step, the user (302) may be ready to initiate the digital certificate receiving process. In an example embodiment, this may be performed by entering a Personal Identification Number (PIN) at a mobile device (314). The mobile device (314) may include, but not limited to, smart phone handset, tablet, and other smart devices that may be coupled to a PKI enabled SIM (324) (also referred to as PKI-SIM). A person of ordinary skill in the art will understand that the mobile device (314) may be similar to the computing device (104) of FIG. 1 in its functionality.

In an embodiment, the mobile device (314) may include an interface for communication with CA device (306) through CA application programming interface (APIs). The mobile device (314) may include middleware (316) that facilitates execution of set of instructions configured in mobile applications (318) through middleware APIs, as shown in FIG. 3. The mobile device (314) may be coupled to the PKI-SIM or PKI Applet API (324) via an interface link (320). The user (302) may request for "Certifying Signing Request" (CSR). This may involve asymmetric key pair generation inside PKI-SIM hardware (324) and subsequently asymmetric encryption (called signing). This may also enable to prepare a specific template which moves to CA device (306). The details of logical blocks of key generation, SIM card access, and other aspects may be explained in further figures of the disclosure. Based on received CSR from end-entity and the positive indication from KYC verification (at 304), the CA device (306) may generate a digital certificate for a specific user (302) and may link it with the user's demographic information. In an embodiment, the CA device (306) may also store a copy of digital certificate, user's public key, certificate serial number, and other information in the respective repository (shown as certificate database in FIG. 3). The newly generated digital certificate may be sent back to the end-entity, and specifically to PKI-SIM (324) via the middleware (316). In an example embodiment, the PKI-SIM (324) may store the received digital signature in secret memory which can be read by the authentication process but may not be deleted except when the user (302) may request to revoke the entire digital certificate. This process may be called on-boarding (further described in FIG. 5 herein), which may be a single time process but may be a mandatory step for all digital certificate issuance process.

In an embodiment, the KYC verification process may include several additional features. For example, the KYC verification process may include offline verification that may be performed to remove manual intervention. The offline verification may need submission of a digitally signed XML file (which may be protected by share code set by a user) which may be linked with user phone number. In another embodiment, the KYC verification process may include feature of uploading a real-time video as proof of liveness of the user (302). This may facilitate to indicate liveness of the user (302) and also images can be cross verified with other sources of information. In an alternate embodiment, the KYC verification process may include evaluating presence and participation of users to various online, public, or social media also as existence and liveness of a user, in addition to other techniques such as face to face (F2F) verification or verification by existing artifacts (social security number, etc.). This aspect may be considered as complementary support information for KYC verification/e-KYC verification.

In an embodiment, the interface of the mobile device (314) may communicate with the CA device (306) via link (312). The link (322) may define the interface between the middleware (316) and the mobile application (318). The link (312) may provide certain mandatory parameter exchanges over network, wherein the parameter exchanges may be available in the form of CA-Server APIs, as covered in Table 1.

TABLE 1

CA side API input/output details

| Sr. No. | API rationale | Input to CA Parameters | Output from CA Parameters | Remark |
|---|---|---|---|---|
| 1 | Generate Digital Certificate | CSR data, Mobile No. | Digital Certificate | Conditional to KYC/e-KYC passed |
| 2 | Get linked Digital Certificate | Mobile No., Certificate Serial No. (optional) | Certificate/ Certificates associated with the Mobile No. | It may return single of multiple certificates. |
| 3. | Certificate Validation Check | Digital Certificate details | Valid/Invalid with error details | "Error details" may be in form of error code or detailed text. |

Apart from mentioned APIs in Table 1 for CA server-side features, the framework may also provide several other auxiliary APIs such as certificate duplicity check (duplicate public key), extraction of user data (for example, mobile number) from certificate, and other such aspects. In an embodiment, in addition with the mentioned input parameters to the CA server, a user token may be optionally included with all APIs to provide higher security. The communication link may be recommended to be used over a secure channel (such as HTTPS, SSL, TLS, and the like).

Further, as shown in FIG. 3, the mobile device (314) may provide a user interface to collect input and also display output to the user (302). In an embodiment, the proposed system may also enable communication with the CA device (306) via a network bridge/communication (for example, Internet). The user (302) may provide PIN and other relevant information (account credentials, demographic credentials, etc.) through the mobile device (314) and may receive one or more status reports pertaining to events. In an embodiment, the mobile device (314) may primarily avoid storing or processing any sensitive data (except communication layer security), but it may behave as a general processing medium and user interface. The mobile device (314) may contain various logical blocks such as the middleware (316) and the mobile application (318). In an embodiment, the middleware (316) may be a library module that creates interface with PKI-SIM card (324), CA/Sub-CA (306), and the mobile application (318). The middleware (316) may process various data formats as per standard templates and can also perform non-sensitive operation. The middleware (316) may also create a suitable interface (varies with mobile device capability) to communicate with the PKI-SIM card (324). The interface link (320) may define communication details for the middleware (316) and the PKI-SIM card (324).

Figure 4:
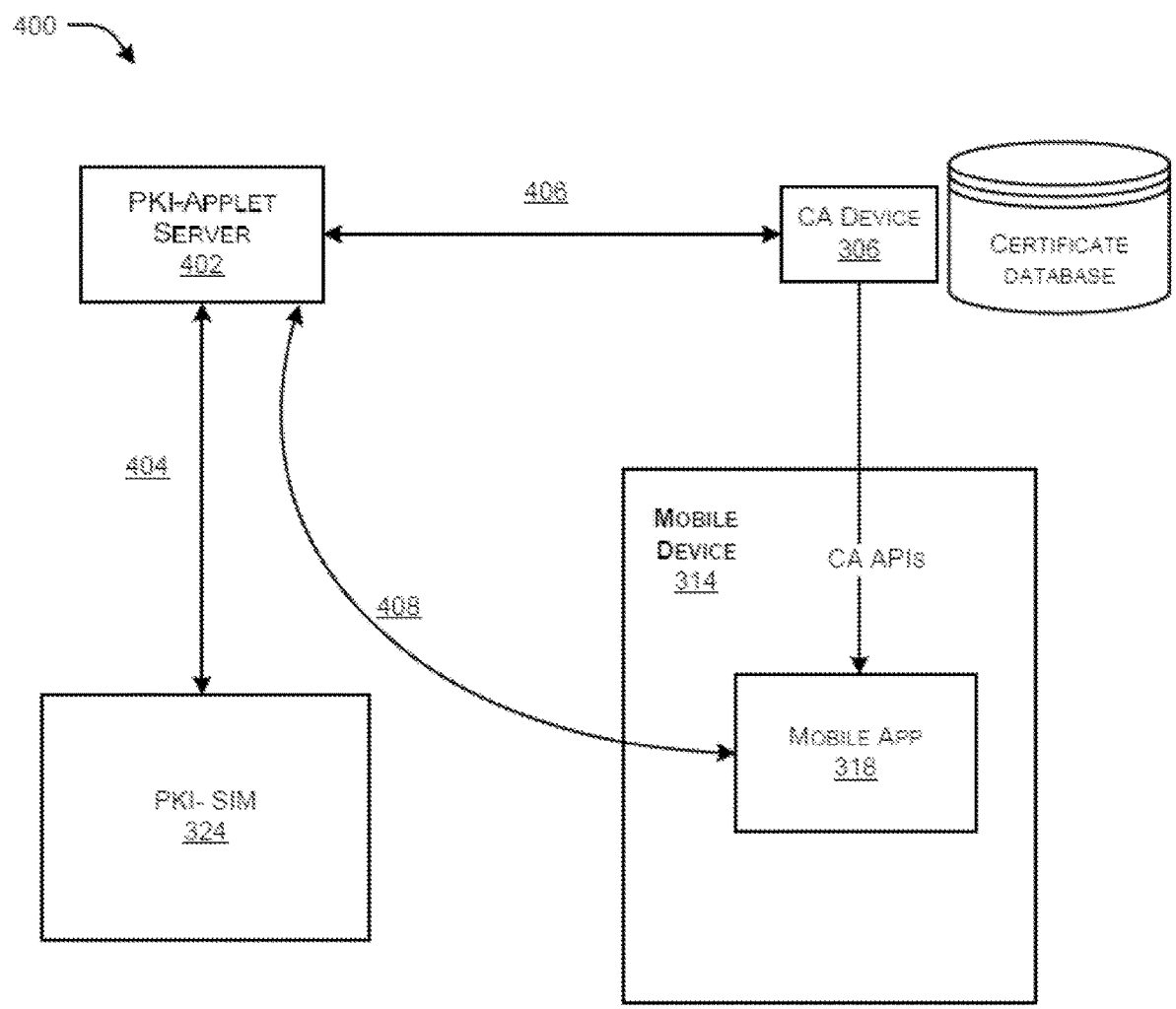
FIG. 4 illustrates a block diagram representation (400) illustrating an alternate framework for FIG. 3, in accordance with an embodiment of the present disclosure.

FIG. 4 illustrates a block diagram representation (400) illustrating an alternate framework for FIG. 3, in accordance with an embodiment of the present disclosure. As shown in FIG. 3, the alternate framework may exist in implementations where PKI enabled SIM card (324) may communicate with a remote server/PKI-Applet server (402) via link (404), wherein the server (402) relays data to the CA device (306) via link (406) and the mobile device application (318) via link (408). In an embodiment, when the link (408) may not be available, the data may be routed through the link (406). The routing of sensitive data through the server (402) may cause a security concern, which may depend on digital certificate guidelines as followed in the corresponding location/region. In this case, the exemplary framework of FIG. 3 may avoid this concern as the data therein is not routed through the remote server (402) and direct interaction is made to PKI enabled SIM card (324).

Figure 5:
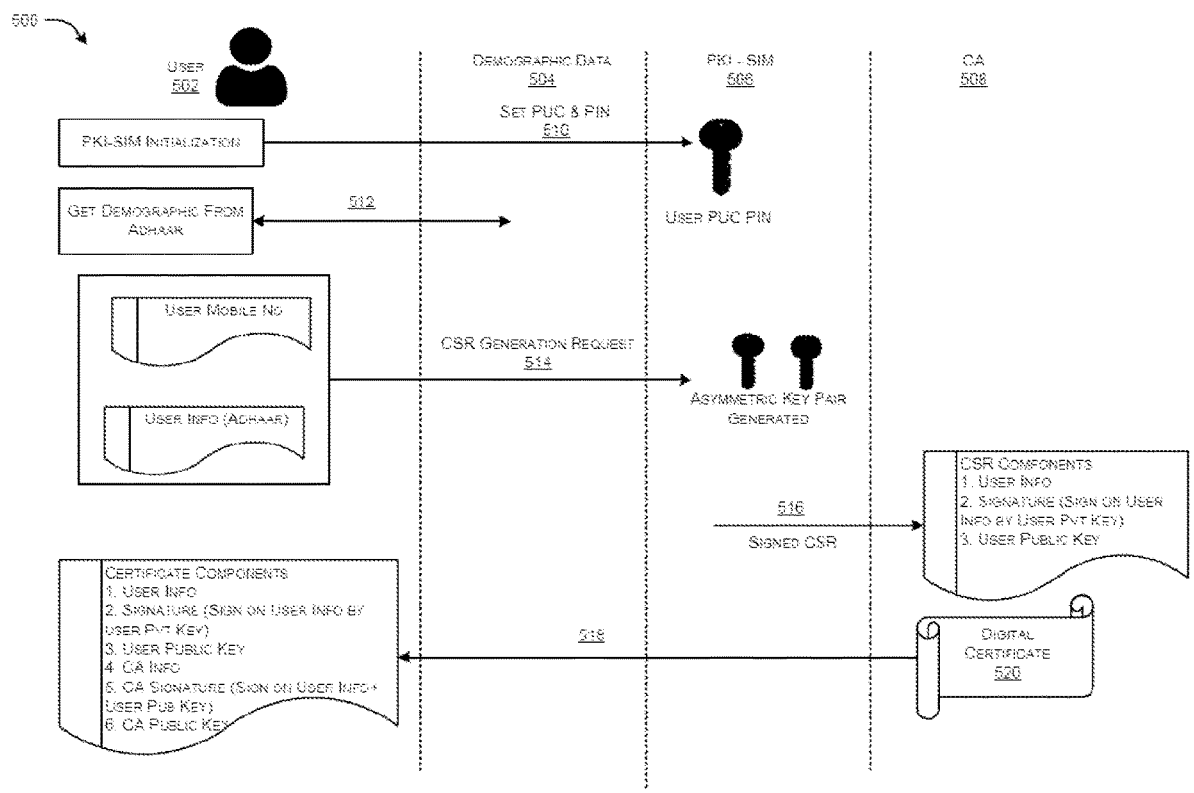
FIG. 5 illustrates an exemplary sequence diagram (500) showing an onboarding process, in accordance with an embodiment of the present disclosure.

FIG. 5 illustrates an exemplary sequence diagram (500) showing an onboarding process, in accordance with an embodiment of the present disclosure. At 510, the user (502) may initiate the digital certificate receiving process by PKI-SIM initialization using user mobile device such as mobile device (314). The mobile device (314) may be coupled to the PKI enabled SIM (506). A person of ordinary skill in the art will understand that the PKI enabled SIM (506) may be similar to the PKI enabled SIM (324) of FIGS. 3 and 4 in its functionality. It may be appreciated that the SIM card may be operatively configured for a user equipment i.e., the mobile device. In an embodiment, the SIM card may be an embedded SIM as an e-SIM or a normal SIM card. Further, in this step 510, the user (502) may enter a personal identification number (PIN) and Personal Unblocking Code (PUC) details at the mobile device (314) enabled with PKI-SIM (506). At 512, the user mobile device (314) may retrieve user's demographic information from a demographic database (504). At 514, the user (502) may request for "Certifying Signing Request" (CSR), which may involve asymmetric key pair generation inside PKI-SIM hardware, which may be subsequently enabled for asymmetric encryption (called signing). At 516, the signed CSR may be sent to CA device/infrastructure (508) in a specific template including CSR components such as, for example, user information, signed user information using private key of user and user public key. A person of ordinary skill in the art will understand that the CA device (508) may be similar to CA device (314) of FIGS. 3 and 4 in its functionality. Referring to FIG. 5, based on received CSR, the CA device (508) may generate and share digital certificate with the user mobile device (314) at step 518 and may link it with the user's demographic information. The digital certificate may pertain to certificate components including user information, signed user information signed by user private key, user public key, CA information, CA signature signed using the user public key, and CA public key.

Figure 6:
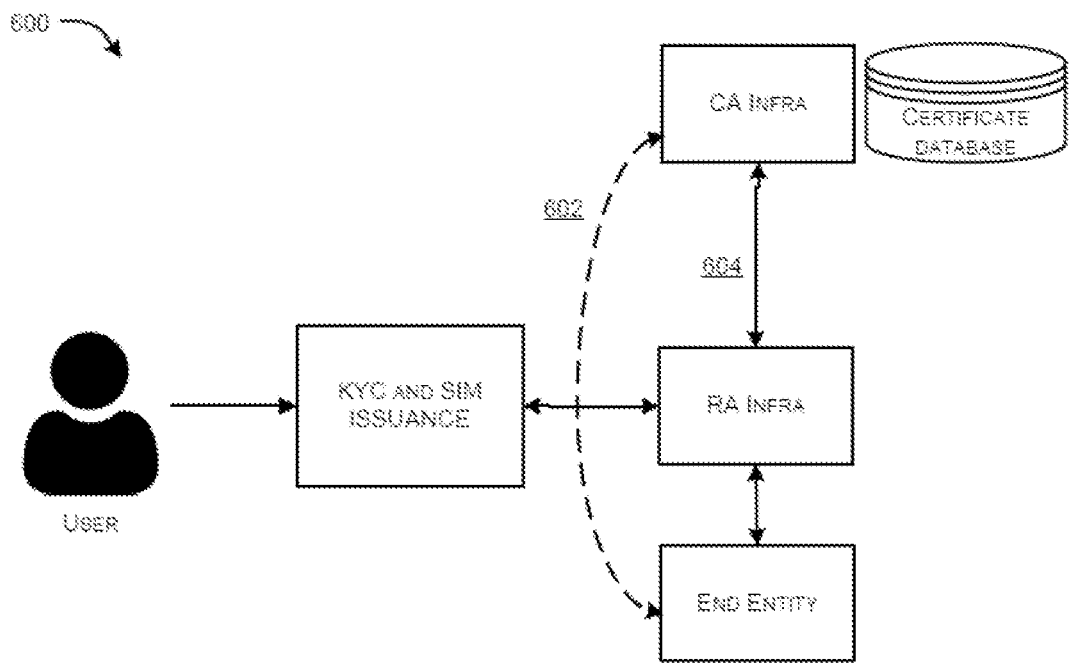
FIGS. 6 and 7 illustrate exemplary block diagram representations (600 and 700, respectively) showing exemplary functions of a mobile network operator (MNO), in accordance with an embodiment of the present disclosure.
Figure 7:
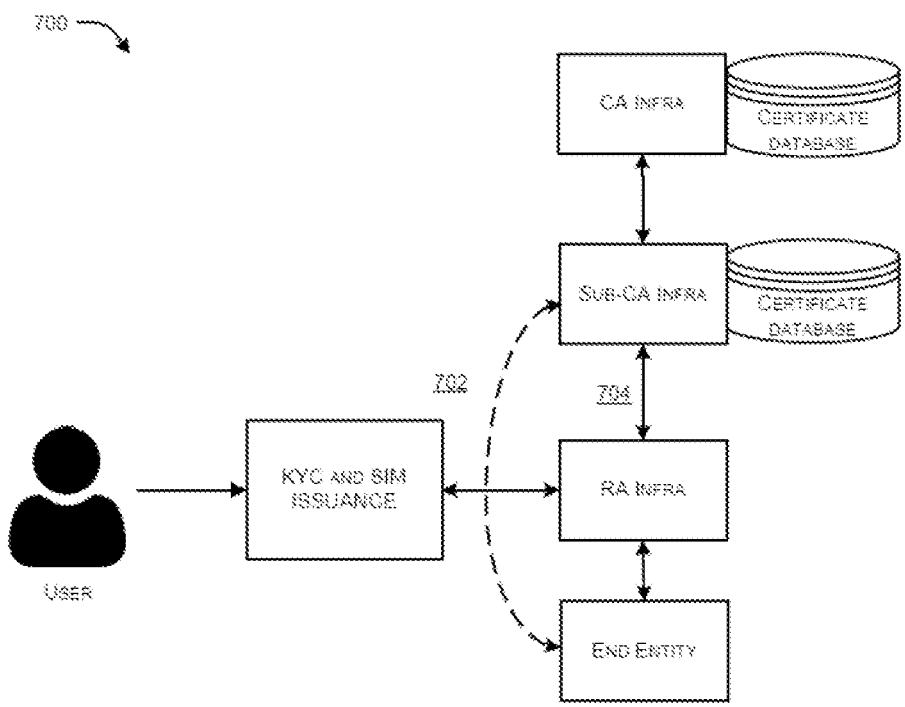

FIGS. 6 and 7 illustrate block diagram representations (600 and 700, respectively) showing exemplary functions of the MNO, in accordance with an embodiment of the present disclosure. As shown in FIGS. 6 and 7, MNO may not behave as CA, but only as a Registration Authority (RA), which may be further connected to a CA (FIG. 6) or a sub-CA (FIG. 7) or root CA. In this embodiment, MNO only verify KYC or e-KYC documents and may report back to CA/sub-CA or root CA which takes further control of issuing digital certificates. The user or end entity may communicate directly with CA (via link 602) or sub-CA (via link 702) or optionally via RA (via link 604 or 704).

Figure 8:
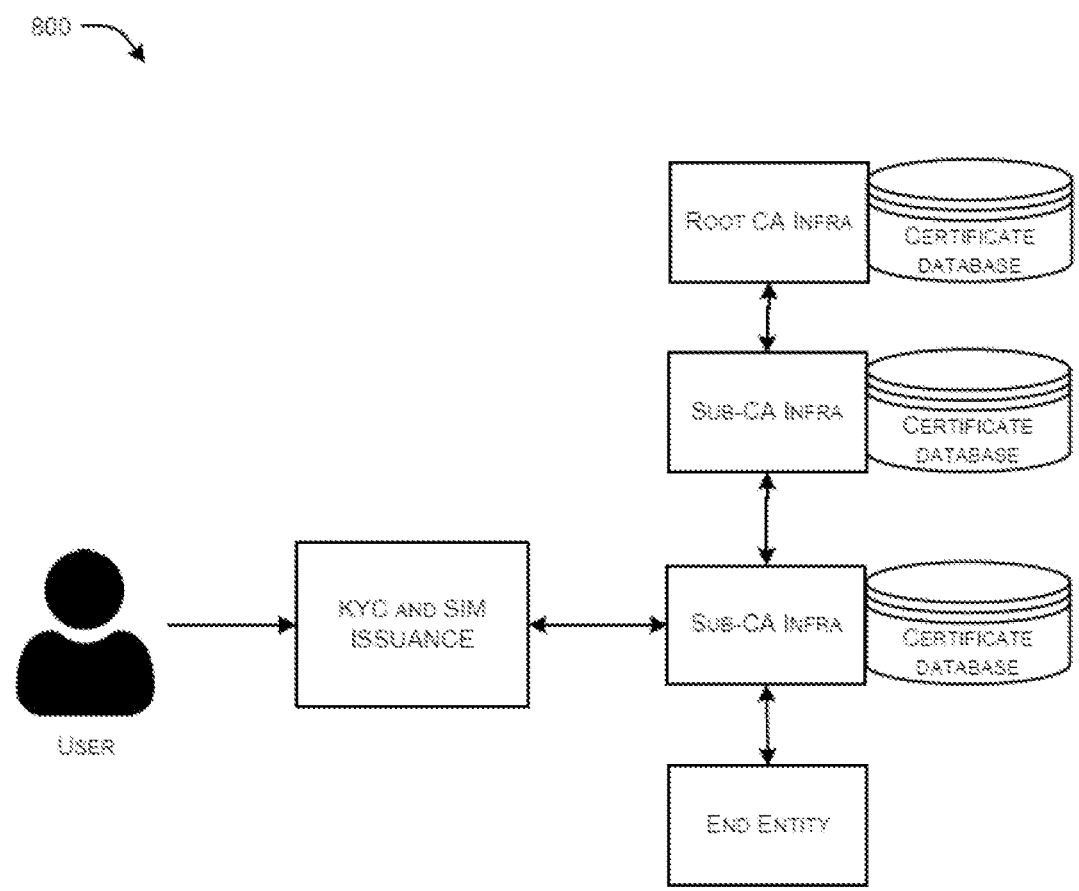
FIG. 8 illustrates an exemplary block diagram representation (800) showing an alternate example for FIG. 6, in accordance with an embodiment of the present disclosure.

In another embodiment, the MNO may operate as subordinate-CA or sub-CA which may be authorized by root CA. FIG. 8 illustrates a block diagram representation (800) showing an alternate example for the framework of FIG. 6, in accordance with an embodiment of the present disclosure. As shown in FIG. 8, the framework may include one or more sub-CA which may be authorized by root CA. The sub-CA may receive the authorization certificate which may be digitally signed by root CA such that sub-CA can issue certificate to end nodes or entity. In an embodiment, the logical depth of sub-CA may be at any extent based on practical implementation and one or more sub-CA may be authorized by respective superior root-CA or another sub-CA. In an embodiment, to ensure maintaining root of trust, the end-node may need to maintain all the certificates or can store few numbers of digital certificate following the trust chain.

As shown in FIGS. 6-8, it may be observed that the end-entity may be capable to issue digital certificate for other end-entity. This may also enable to issue ID to a machine or device and may not be restricted/limited only to a human. In an embodiment, an individual or entity having a digital certificate may further issue certificates to other devices/machines or entities based on requirement and legal validation. This means that all end-entity or users may behave as a sub-CA in the network and they may issue certificate(s) to other end-entity (living or non-living) to participate in digital network.

Figure 9:
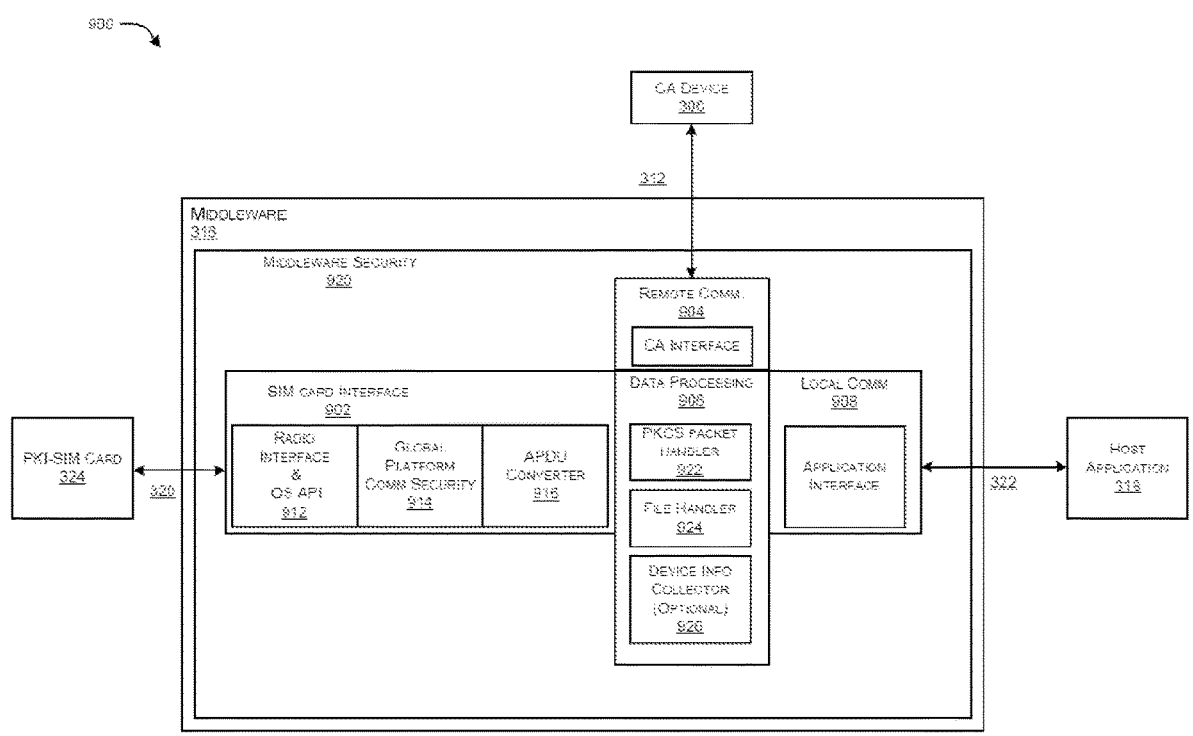
FIG. 9 illustrates an exemplary block diagram representation (900) of a middleware (316) of FIG. 3, in accordance with an embodiment of the present disclosure.

FIG. 9 illustrates a block diagram representation (900) of middleware (316) of FIG. 3, in accordance with an embodiment of the present disclosure. As shown in FIG. 9, the middleware (316) may include a SIM card interface (902), which may be a module handling data communication with the PKI-SIM card (324) and necessary packetization with data handling. The middleware (316) may also include a middleware security module (920), which may enable access rules to be defined to give an access to other applet other than telecom. The SIM card interface (902) may include three major sub-blocks/modules such as, for example, radio interface layer (RIL) and OS API (912), global platform (GP) communication security (914), and an application protocol data unit (APDU) converter (916). The RIL and OS API (912) may be a standard block, which may provide compatible APIs to access the PKI-SIM card (324), based on various OS type and requirements of smart phone, handset, original equipment manufacturer, etc. The interface specification and capability of communication may be subject to availability and compatibility of OS and mobile hardware handset manufacturer. The GP communication security (914) may provide various levels of security for PKI-SIM card communication. In an embodiment, the system may enable access privilege to PKI applet based on access rule application (ARA) specification. Apart from this, the communication layer security between the PKI-SIM card (324) and host mobile device/application (318) can be controlled by specific standard mechanism such as SCP1, SCP2, SCP3, SCP10, SCP11, and the like. The PKI mechanism in the mentioned embodiments may be based on symmetric key or asymmetric key. In either case, the security keys may be stored securely inside the middleware (316) either during distribution stage or at run-time with remote server interaction. In an example embodiment, the APDU converter (916) may be configured such that communication of the PKI-SIM card (324) and middleware (316) may follow ISO-7816 APDU structure. In an example embodiment, some or all the communications may follow a structured APDU protocol. For PKI applet, the APDU data structure may be customized based on the requirements of the regulations. The commands that are pre-defined or pre-set may fulfil the requirements of PKI framework and may also be in synchronization with API interfaces for middleware-host application. The APDU converter (916) may store raw APDU data structure and may add suitable prefix or suffix as per dynamic data structure of input and output.

As shown in FIG. 9, the middleware (316) may include a remote communication module (904), which enables remote communication of the middleware (316) with the CA device (306) via link (312). The remote communication module (904) may also perform following tasks inside the middleware (316), as shown in Table 2, which may be used in other parts of middleware and host-application.

TABLE 2

Tasks performed by Remote Comm inside middleware

| Sr. No. | Operation/Internal APIs | Remarks |
|---|---|---|
| 1 | Check CA Server (String CAIP, int CA Port) | Check if CA Server is available/reachable |
| 2 | Handshake (Key) | Create application level authentication by symmetric/asymmetric/token key exchange |
| 3 | Request_Old Certificate (Identity) | Request available certificate(s) associated with mobile no. or other identity |
| 4 | Connect Https (Get/Post) | Establish https layer communication for GET and/or POST type data transfer |
| 5 | Request Certificate (CSR, Identity) | Request for Digital Certificate providing CSR data and Identity such as Mobile No |

As shown in FIG. 9, the middleware (316) may include a local communication module (908), which enables communication with local application(s) (318), which may be single or multiple applications via link (322). The local communication module (908) may include an application interface for enabling the communication with the local applications (318). In an embodiment, the middleware (316) may handle data flow to the PKI-SIM card (324) as only one logical channel may be provided to the middleware (316). As shown in FIG. 9, the middleware (316) may include a data processing module (906), which may further include sub-modules necessary for internal operations. The sub-modules may include Public Key Cryptography Standards (PKCS) packet handler (922), file handler (924), and optionally, device information collector (926). The PKCS packet handler (922) handles task as per various requirements of input and output data based on PKCS, which are internationally approved data encoding and packetization techniques. This may be used to create right template for certificate, CSR, signature information, and other such functions. Further, the middleware (316) may accept various file types for signing, encryption, decryption, signature verification, and the like. The file handler (924) may be a module that may parse these files in an appropriate way and may prepare data required for PKI-SIM (324) or vice versa. The device information collector (926) may assist the middleware (316) to obtain or collect various devious parameters such as GPS location, hardware model, SIM serial number, etc. for various add-on services for internal processing.

Further, in reference to FIG. 9 and FIG. 3, the host application/application module (318) may primarily handle end user application related task, wherein the functionalities may vary with use cases. In an embodiment, the on-boarding process as mentioned in FIG. 3 and FIG. 5, may be mandatory such that after completion of on-boarding, the user may obtain an identity in form of digital certificate. The digital certificate along with other PKI-SIM capability (document signing, encryption, etc.) and various applications may be built based on the features available in the middleware (316) and the PKI-SIM card (324). The application module (318) may interact only with the middleware (316) via the link (322), based on fundamental properties, as explained in Table 3.

TABLE 3

Middleware-Application Interface APIs

| Sr. No. | Middleware-Application Interface API | Description |
|---|---|---|
| 1 | Select PKISIM (SIM Slot) | The middleware internally enumerates the SIM availability. There may be more than one PKI enabled SIM or no PKI enabled SIM. The application must point-out the target SIM in proper SIM-slot by following API |
| 2 | PUC, PIN Change Update | The first expected command to the PKI applet is to initialize PUC and PIN |
| 3 | Get Certificate Signing Request (CSR) | After setting up PUC and PIN, application is allowed to use API to request for CSR or Certificate Signing Request template. Key pairs (Private and Public key) are generated if there are no keys available in SIM card. |
| 4 | Download Certificates to SIM | After CSR has been generated, the application may send the CSR to respective CA for signing and certificate issuance. Once application receives the digital certificate, it uploads the same along with all other certificates in the chain including intermediate/ subordinate CA and root CA to the SIM card. |
| 5 | Export Certificates from SIM | The stored certificates inside SIM is exported to application. |
| 6 | Signing Document | Any data is digitally signed by the private key stored inside SIM. The raw data is sent to middleware which calculates the message digest (SHA256 or similar) and then the digest is sent to PKI-Applet to sign by private key stored inside SIM. The API takes various inputs to control the signing mechanism and also to prepare desired output data format. |
| 7 | Reset SIM/KEYS | This optional feature and may not be used in real production. The PUC, PIN also will be reset as blank and all Keys and certificates will be deleted from SIM card. |
| 8 | Generate Symmetric Keys | Symmetric (AES/DES/3DES etc.) key generation options. |
| 9 | Encryption with Asymmetric Key (Public Key) | The method provides support for Asymmetric Encryption with public keys. For practical use, Public key of Recipient is meaningful, hence, suitable Recipient's certificate needs to be provided. |
| 10 | Decryption with Asymmetric Key (Private Key) | The method provides support for Asymmetric Decryption with Private key. For practical use, Private key of recipient to be used. |
| 11 | Hybrid (AES-RSA) Internal Encryption | The Symmetric-Asymmetric hybrid encryption process perform complete operation inside PKI-Applet. |

TABLE 3-continued

Middleware-Application Interface APIs

| Sr. No. | Middleware-Application Interface API | Description |
|---|---|---|
| 12 | Hybrid (AES-RSA) Internal Decryption | The Symmetric-Asymmetric hybrid decryption process performs complete operation inside PKI-Applet. |
| 13 | Verify Signature | This method verifies the signature. It is performed inside middleware (not in PKI applet) and simply compares the signed data against the suitable public key. |
| 14 | Store Secure raw Data | Store data securely in PKI-SIM Memory using PIN |
| 15 | Read Secure Data | Read data from secure memory using PIN |

The middleware (316) may be a logical block that resides in the mobile device (314). In an embodiment, the middleware (316) may be available in library form which may be included with any application. The library may be made secured by digitally signing package, wherein the digital signing may be different from SIM card PKI framework. The keypairs may be owned and maintained by developer or distributing authority or certification body of the middleware (316) that may take control and authority to maintain the security of the middleware (316). In an embodiment, in the context of global identity management, the signing middleware (316) before distribution authority may be maintained by centrally controlled governing body linked with certification and testing agency. The distribution of middleware (316) may be made through various means like publicly available website, play/app-store of various OS provider portals, and the like.

Figure 10:
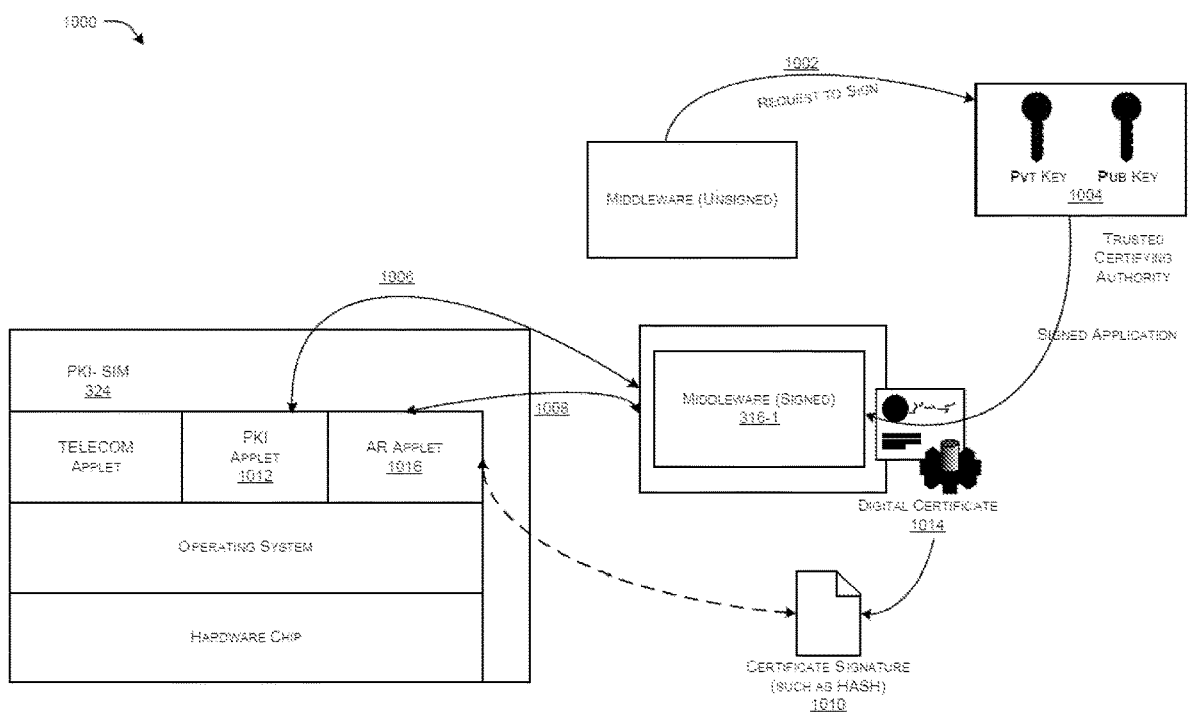
FIG. 10 illustrates an exemplary block diagram representation (1000) of a security architecture of the middleware (316) of FIG. 9, in accordance with an embodiment of the present disclosure.

FIG. 10 illustrates a block diagram representation (1000) of a security architecture of the middleware (316) of FIG. 9, in accordance with an embodiment of the present disclosure. The security architecture of middleware (316) may be controlled by a multilayer standard security process. As shown in FIG. 10, the middleware (316) may be a library that may normally not function independently, but rather work with any application. Alternatively, middleware (316) can also be created as an independent service/form of application. The application may be necessary to get digitally signed by an authorized body (1004) before distribution of the application. The authorized body (1004) may hold control of a private key of digital signature. After digitally signing, the authority provides a digital certificate (1014) for the specific application to run on a host mobile device. The unsigned middleware (316A) may request to sign (1002) to the authorized body (1004) and is issued or distributed as a signed module of the middleware (316). In an embodiment, any generic application may not be authorized to communicate with the PKI-SIM card (324). In an embodiment, a gatekeeper may be placed inside another special applet/application in the PKI-SIM card (324), namely Access Rule (AR) Application or ARA or ARA-M (Access Rule Application Master) (1016). The ARA (1016) may include the entries of all desired host applications (residing in the mobile device) and the target applet (1012) may reside at the PKI-SIM card (324). In an embodiment, communication between the middleware (316) and the ARA applet (1016) may be performed through link (1008) and between the middleware (316) and the PKI applet (1012) through link (1006). In an embodiment, the unique message digest (HASH) (1010) of the assigned digital signature (1014) may be entered as an entry of the host application. Hence, specific central authority (1004) may provide the access authority of middleware (316) and the PKI-SIM card (324) through the special ARA applet (1016). However, apart from access authority for communication with PKI-SIM card (324), there may be channel security as explained above regarding functioning of the SIM card interface (902) in FIG. 9.

In an embodiment, the PKI-SIM card (324 in FIG. 3) may be linked with a mobile device (314 in FIG. 3) and a secure medium of end-entity (shown in FIGS. 6 and 7). The end-entity may generate key pairs (private and public key), generate CSR, securely store digital certificates issued by CA or sub-CA. This entity also participates to issue another certificate for other end-entity or to digitally sign any data for various usages.

Figure 11:
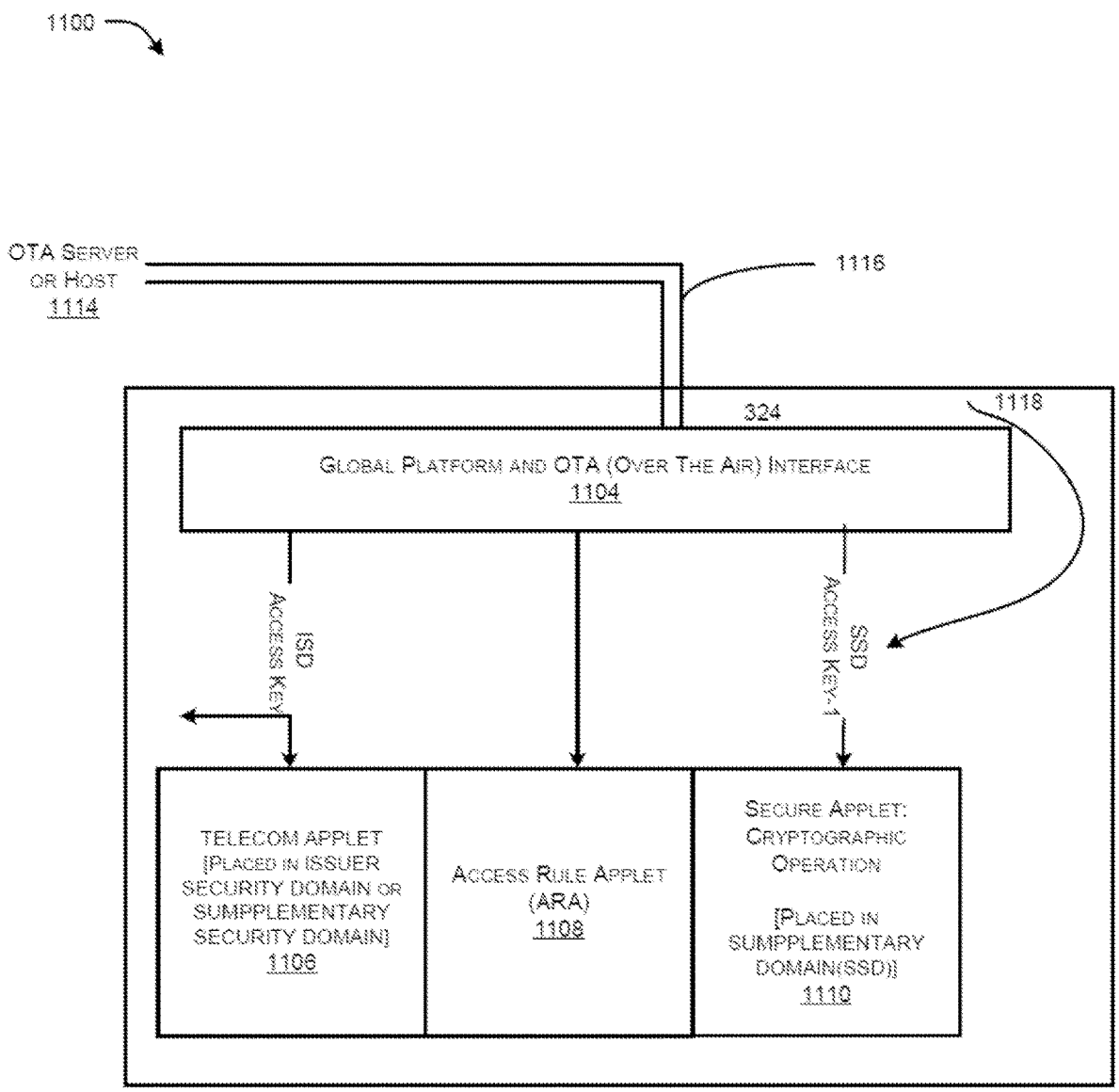
FIG. 11 illustrates an exemplary block diagram representation (1100) of PKI-SIM card (1102), in accordance with an embodiment of the present disclosure.

FIG. 11 illustrates a block diagram representation (1100) of PKI-SIM card (324), in accordance with an embodiment of the present disclosure. As shown in FIG. 11, the PKI-SIM card (324) may include two existing blocks as Global Platform (1104) and Telecom Applet (1106). In an embodiment, an application named as secure applet (1110) may be included to make it capable to provide all functionalities of a secure environment. The applet (1110) may be placed in isolated segment or security domain (1118) so that it is not accessed by other applets or applications. It may be optionally protected to be accessed remotely via OTA (Over-The-Air) server (1114) via SMS or HTTPS route (1116) and also may be protected from side channel access after deployment. The functionalities of secure environment (1110) may include secure processor, secure memory, hardware accelerator, and asymmetric operations. Further, the PKI-SIM card (324) may include Access Rule Applet (ARA) (1108) which may be global for all the applets stored in the PKI-SIM card (324). In an embodiment, the PKI-SIM card (324) may include main security block or applet (1110) that contains features of PKI environment with the following attributes of the applet (1110).

a) On board key pair generation and protection of private key inside SIM b) Secure storage of RSA or ECC keys and digital certificates c) Secure storage of user data d) Signing of any user data e) Encryption of any data I. With asymmetric keys and algorithm (RSA, ECC)

II. With symmetric keys and algorithm (AES, DES, 3DES)

f) Decryption of any data

I. With asymmetric keys and algorithm (RSA, ECC)

II. With symmetric keys and algorithm (AES, DES, 3DES)

g) Support of hashing algorithm: SHA, MD5, etc.

In an embodiment, the features and functionality of the applet (1110) may be in sync with firmware and application requirements and API details. To achieve high-level APIs, the PKI-Applet contains micro-level implementation of functions based on ISO-7816 APDU exchange. The details of internal implementation of micro level APIs of PKI-Applet is elaborated in Table 4. It may be appreciated that the PKI-SIM applet may include various extra APIs (apart from mentioned API list in Table 4) to provide extended features to host smart phone host application.

TABLE 4

KI-SIM Applet API details

| Sr. No. | API details | Remark |
|---|---|---|
| 1 | SELECT AID | The Application to be selected by ISO-7816 standard SELECT command pointing to the specific AID of PKI-SIM applet. |
| 2 | Device Info | Optional Command. The Application contains the Device and firmware version info including various flags like state of key initialized etc. |
| 3 | Personal Unblocking Code: PUC | PUC is the mandatory command to be issued First time of SIM initialization. Using the PUC, user can set, change the PIN in future. PUC cannot be changed, deleted after setting first time. |
| | Personal Identification No (PIN): PIN is the secret key for user authentication. All secure and sensitive operation needs PIN verification before execution | |
| 4 | Set UP PIN | PUC is required to set-up PIN. Hence, this command can only be issued after setting up PUC |
| 5 | Verify PIN | All secure operations such as Key generation, signing operation needs PIN verification. |
| | Key Generation: Key generation is allowed only when SIM applet is initialized i.e. after setting up PUC and PIN. There are various modes (Symmetric and Asymmetric) of Key generation including format of output (raw, DER, Base64). | |
| | Key refresh: Symmetric/asymmetric: | This command has no specific role related to key generation but shall refresh and ensure the data are stored in File system and in response, it shall return the File Id where Key info is stored. |
| 6 | Generate new Keys: Symmetric/asymmetric: Raw/DER/Base64 | This command shall initiate the process to generate new keys either symmetrie or asymmetric in specific format. |
| 7 | Key Deletion: Symmetric/asymmetric | Key deletion command shall delete the current keys and all data stored in file systems. It will erase and resets all the PUC and PIN information. |
| | Signing: The Signing process is a sensitive secure task using PKI SIM. It must be followed by a successful PIN Verification step. Also, the key pair must be available before successful execution of the process. | |
| 8 | Signing with/Without Data Encoding | With Data encoding technique, only user data may be injected to SIM and entire CSR preparation may be done inside SIM including PKCS packetization For without Data encoding, the SIM may be provided only message digest in suitable format and the output signature may be wrapped with other non-sensitive data and converted to desired file format at outside SIM (inside Middleware). It is faster process than first method. |
| 9 | Document Signing | Document Signing is being done using internal keys. There are two modes: Sign to only Message Digest (HASH) and Sign to Raw data (HASH is calculated internally) |
| 10 | Public Key Encryption | This command performs the Public Key Encryption for external data encryption. Public key info may be taken from external source. |
| 11 | Private Key Decryption | This command performs the Private Key Decryption. The internal Private key is being used. |
| 12 | Hybrid Encryption | In this process external data is encrypted by a symmetric key (generated inside PKI applet) The Symmetric key is encrypted by asymmetric public key of recipient who is expected to decrypt the data. |
| 13 | Hybrid Decryption | The symmetric key is extracted by asymmetric decryption operation by recipient's private key. The encrypted data is extracted by symmetric key decryption mechanism. |
| | Download Information: Get any information from the SIM card | |
| 14 | SELECT File | Before performing any Read (Download) operation SELECT command must be issued |
| 15 | Read Binary | Once the respective File is selected, the Read Data command is issued to get the specific File data stored inside SIM. This process may need PIN verification if data is stored/protected in secure memory. |
| | Upload Information: Data can be uploaded to SIM to specific File | |
| 16 | SELECT File: | Before performing any Write (Upload) operation, SELECT command must be issued |

TABLE 4-continued

KI-SIM Applet API details

| Sr. No. | API details | Remark |
|---|---|---|
| 17 | Write Binary | Once the respective File is selected, the Write Binary command is issued to write external data in specific area of PKI-SIM applet. This process may need PIN verification if data is stored/protected in secure memory |

In an embodiment, the described framework for digital identity through PKI framework may enable to create a base of trust. The framework may enable several applications that may leverage the framework to provide value added services with enhanced quality ensuring security, integrity, and non-repudiation in the digital network. The PKI feature may provide a very high security layer to the digital world, wherein security is usually the additional aspect to enhance Quality of Service (QOS) of a solution. In an embodiment, the PKI-SIM may be bundled with existing applications to provide enhanced levels of security and trust. Thus, PKI-SIM may also be treated as an enabler to enhance the security aspect in all smartphones or discrete hardware based IoT solutions. The four primary aspects of PKI based framework may include authentication, integrity, confidentiality, and non-repudiation. Further, PKI-SIM may provide end-to-end encryption in a very seamless way and altogether it shall provide a strong support system towards security. In the digital world, the system and method of the present disclosure may be leveraged with PKI-SIM capability for various solutions that include, but may not be limited to, payment and banking application, application including IoT and connected devices, and other independent services.

In the payment and banking application, the PKI-SIM may complement various corners of the financial domain to increase the security level. The support may enhance the fundamental banking process such as demographic detail update (for example, current address, email address, etc.) or any request which requires user consent and authorization. In the daily routine process, PKI-SIM solution may enable to update the security level of financial transactions or digital cheque issuance. In the overall system, the secure SMS (digitally signed SMS or message) may add an extra layer for user verification. The proposed framework may enable various implementations/aspects in the payment and banking application including, but not limited to, mutual authentication in payment domain, end-to-end encryption, secure e-wallet by PKI-SIM card, block chain based on PKI-SIM card, digital cheque issuance, offline payment system, Near Field Communication (NFC) based Point-of-Sales (POS) transaction, tokenization, and other aspects. Each of these aspects are explained in the following figures. It may be appreciated that the mentioned examples/implementations are exemplary and the present disclosure may be included in several other applications.

Mutual Authentication in Payment Domain

The traditional communication channel may only identify the server, wherein most of the devices including a smart phone or PoS terminal in payment world may utilize only the server based authentication. In contrast, mutual authentication (client authentication and server authentication) may minimize the risk of online fraud in e-commerce. With mutual authentication, a connection may occur only when the client trusts the server's digital certificate and the server trusts the client's certificate. This means that not only the user but the devices of the user may also be authenticated before any communication. The mutual authentication may provide better security than server authentication but may include the challenges of protecting private key in client devices. However, implementing the PKI enabled SIM of the present disclosure, enables to mitigate this problem and provide a tamper resistant secure way to store private key required for mutual authentication.

Figure 12:
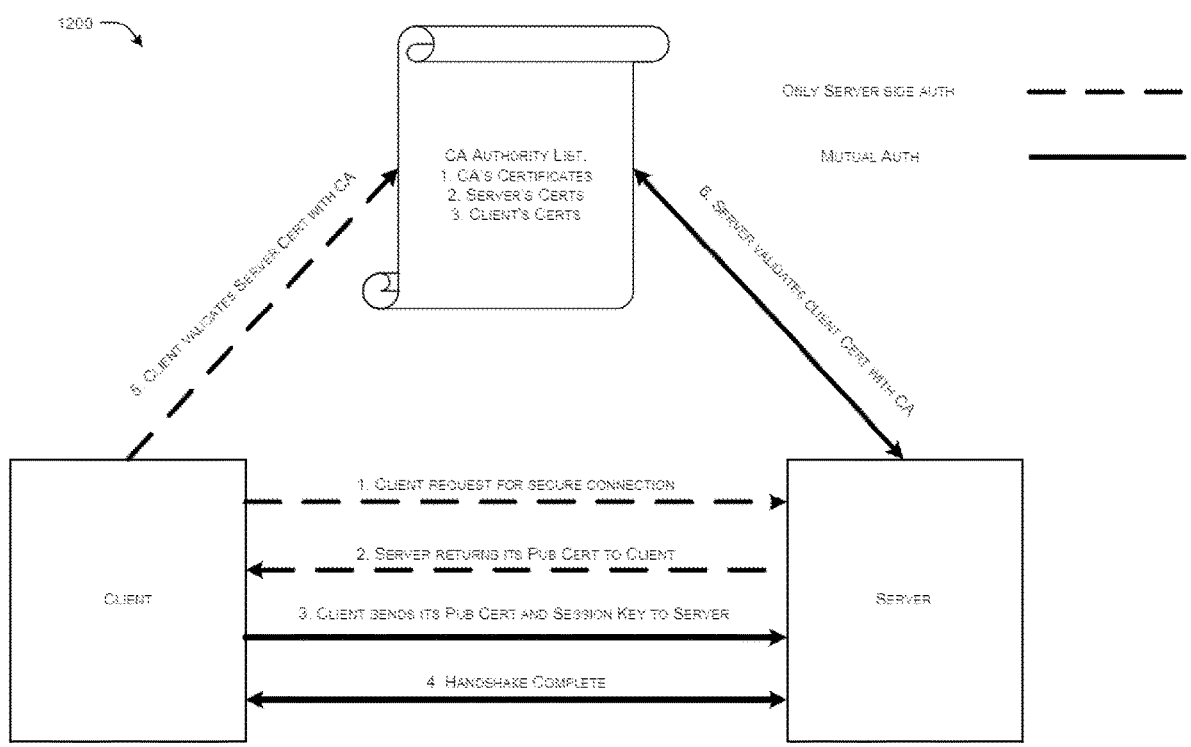
FIG. 12 illustrates an exemplary representation (1200) showing implementation of PKI-SIM in application(s) where mutual authentication is required, in accordance with an embodiment of the present disclosure.

FIG. 12 illustrates a representation (1200) showing implementation of PKI-SIM in mutual authentication, in accordance with an embodiment of the present disclosure. As shown in FIG. 12, the client may request for a secure connection to a server. Based on this request, the server may return a public certificate to the client and the client may send a public certificate and session key to the server, which may be followed by a handshake. In the next step, the client may validate the server certificate with CA device/infrastructure and then the server may validate the client certificate with the CA device/infrastructure, thus completing the mutual authentication. In an embodiment, the PKI-SIM may be used to include the digital signature and certificate property along with all the requirements of communication. The extra layer of security (client authentication) shall adhere to a high degree of security and trust. In an embodiment, the PKI-SIM may also be capable of providing end-to-end security at application layer which is not fully captured in traditional TLS/SSL which gives channel security at transport layer. For example, in current TLS/SSL, initiation of the secure channel is performed in plain text only, which may be prone to various vulnerabilities. However, with PKI-SIM, even a simple first message such as "client hello" may be signed.

End to End Encryption

In the financial domain, various parameters may be defined as sensitive data, wherein these parameters possibly cannot be stored or transmitted in plain text over the network. The traditional symmetric key based encryption mechanisms may include questionable security threats (as the same key is used to encrypt and decrypt) in comparison to asymmetric key based encryption or decryption. Further, mPIN may have been mandated in some countries as one important factor of user authentication in mobile banking scenarios, wherein mPIN is a sensitive parameter and it has to be end-to-end encrypted. As there is no asymmetric security environment available in conventional smartphones, proprietary solutions are used that are likely to be symmetric key based encryption, thus making it vulnerable to attacks at various points of the network. In the same context, apart from payment solutions, the same vulnerability of end-to-end technique is equally valid for other communication environments such as messenger services, cloud services, online conferences, email encryptions, and other applications. However, the PKI-SIM card based solution of the present disclosure may enable an easy API based environment to get PKI or asymmetric cryptography (RSA/ECC) based end-to-end encryption. This may significantly increase security as per industry practices.

Secure e-Wallet by PKI-SIM Card

It may be known that online e-wallet is being implemented by various organizations, as per recommended practices, the data transmission should be end-to-end encryption at the application layer which is at the top of the transport or network layer. The online e-wallet may include user sensitive personal and financial data associated with an e-wallet, stored in mobile phones, which may be symmetric or asymmetric key based. As the traditional phones lack secure memory and also secure processors, so independent of the encryption technique, the keys may be stored inside phones which may be vulnerable to various attacks by application developers or OS manufacturers. However, by implementing the PKI-SIM card of the present solution, a tamper resistant secure storage environment may be enabled to store user sensitive data to protect from unauthorized access. The proposed solution may also provide asymmetric cryptographic operation to get a higher level of security in comparison to symmetric keys based operation for small and sensitive data.

Block Chain Application Using the PKI-SIM Card

Figure 13:
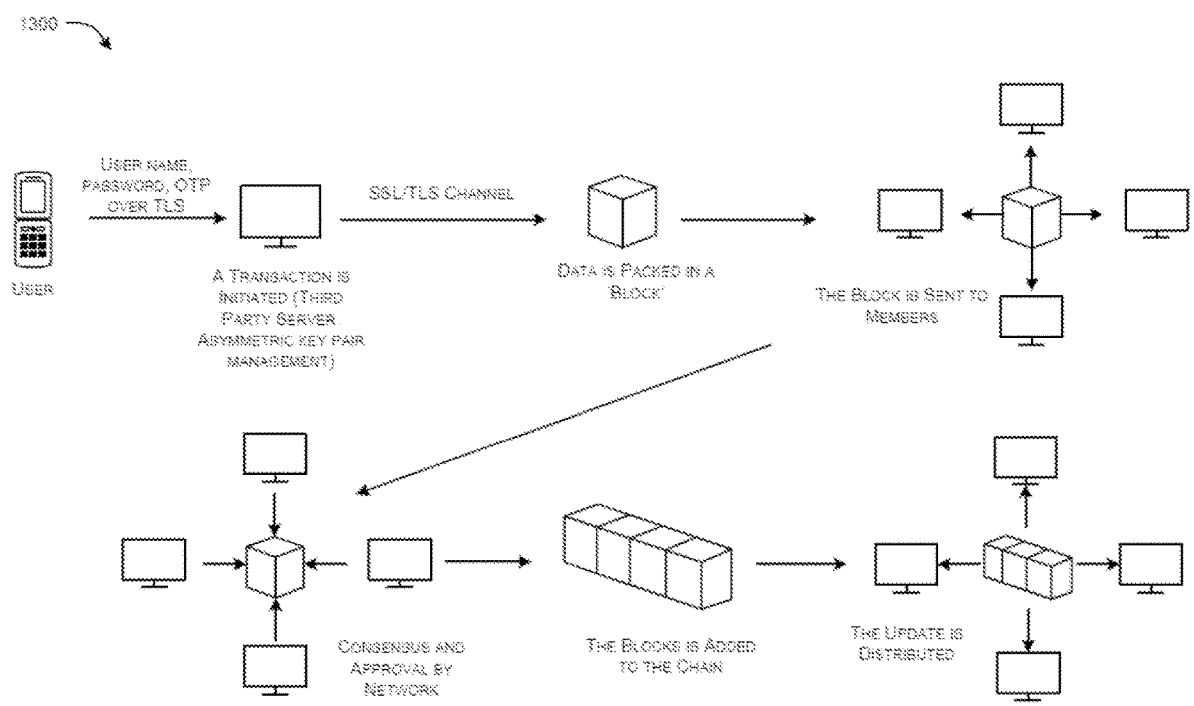
FIG. 13 illustrates a representation (1300) showing a conventional implementation of blockchain based application.

The present system and method may also be applied in block chain based cryptographic currencies as well as other solutions like supply chain and others. FIG. 13 illustrates representation (1300) showing a conventional implementation of block chain based application. Asymmetric cryptography may be the fundamental component of any block chain based solution. However, the current user level hardware eco-system (smart phone or computer) may not be fully equipped with PKI or asymmetric cryptography. The gap may be managed by a third party portal or proxy server which converts and maps each user by its unique asymmetric key pair, as shown in FIG. 13. The asymmetric key pair may be stored and managed in a third party system or server, thus involving significant security risk. However, using the PKI-SIM based solution, each user may be enabled to directly participate in any blockchain network without having security dependency (storing asymmetric keys).

Figure 14:
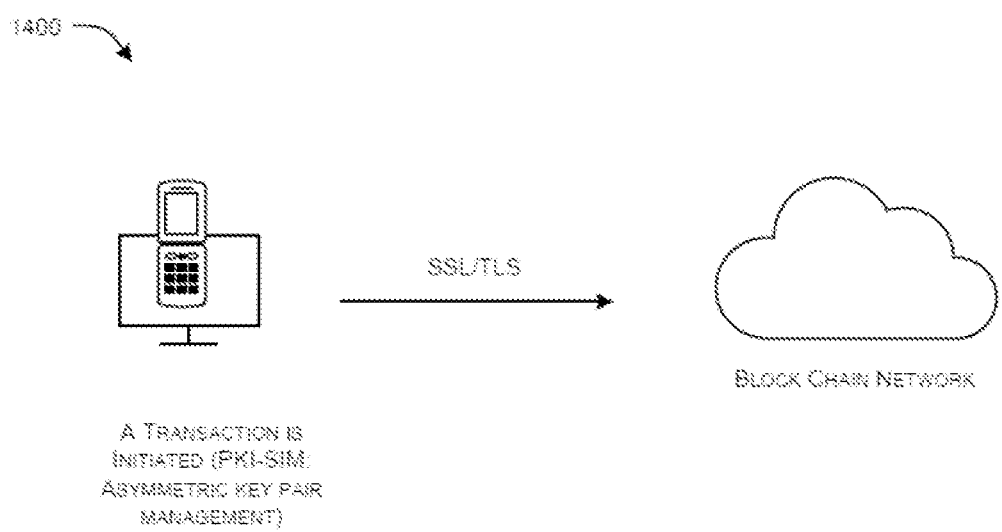
FIG. 14 illustrates an exemplary representation (1400) showing implementation of PKI enabled SIM in a block chain based transaction, in accordance with an embodiment of the present disclosure.

FIG. 14 illustrates a representation (1400) showing implementation of PKI enabled SIM in a block chain based transaction, in accordance with an embodiment of the present disclosure. As shown in FIG. 14, the implementation avoids the need for storing the asymmetric key pair in a third party server and hence ensures greater security than conventional methods.

Digital Cheque Issuance

As per recommended standards by governing authorities, it may be required that a cheque truncation system (CTS) should be based on digitally signed image with end-to-end encryption. The process has not been widely used by individuals because of lack of availability of digital signatures in a very usable form (such as, for example, available only in USB dongle form factor). However, the proposed solution, based on PKI enabled SIM, may enable each user to have access to digital signature in SIM card.

Figure 15:
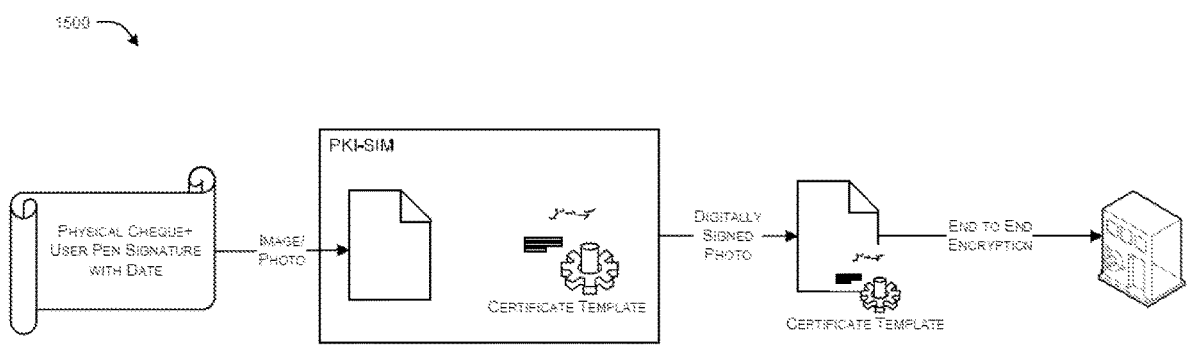
FIG. 15 illustrates an exemplary representation (1500) showing implementation of PKI-SIM in issuance of digital cheque, in accordance with an embodiment of the present disclosure.

FIG. 15 illustrates a representation (1500) showing implementation of PKI-SIM in issuance of digital cheque, in accordance with an embodiment of the present disclosure. As seen in FIG. 15, using PKI enabled SIM card, a user may be able to remotely send a banking cheque in image format (in the form of a digitally signed image) to avoid the need for physical submission of the same. This may ensure not only faster processing time, but may also add sufficient security against manual signature verification and mismatch.

Offline Payment System

As per governing authorities, offline payment systems have been encouraged, especially in areas that may have poor internet connectivity. However, there are no effective solutions in this regard. The existing offline payment systems may be mostly closed loop (or some open loop solutions) with proprietary security schemes, but are mainly symmetric key based. The PKI enabled SIM based system may use a very promising open loop (open standard) architecture with asymmetric encryption mechanism to complement the existing payment network with offline facility. It also can be used to create an independent payment system (wallet) with offline transactions. The interface of the transaction may be used as NFC or quick response (QR) code based communication. In an embodiment, the sender may be linked with the banking system either on credit basis or with an offline wallet. The sender may send the digitally signed token (money) to recipient devices. Based on risk management, the received token amount may be instantly added with its wallet or may be accumulated for claim from the bank once it is online.

Near Field Communication (NFC) Based Point-of-Sales (POS) Transaction

It may be known that NFC may be used while using real banking cards and performing POS transactions. In conventional NFC based systems, the phones or mobile devices may include NFC communication link and a secure element with crypto-processor, wherein the secure memory may be embedded with phone or mobile device stores or processes sensitive data. However, to improve the security, the PKI enabled SIM card may be used, such that the security mechanisms may be driven by MNO and not by the mobile handset manufacturer. In addition, the switching of SIM may be comparatively easier than phone memory considering the fact that SIM has a greater life-time cycle than mobile handsets. Thus, the user may also be able to obtain all benefits of traditional NFC enabled phones in addition to advantages of PKI-SIM as mentioned.

Tokenization

Tokenization may be a process of substituting a sensitive data element with a non-sensitive equivalent, referred to as a token that has no extrinsic or exploitable meaning or value. The token may be a reference that maps back to the sensitive data through a tokenization system such that only an authorized party (issuer banks, card scheme) may have access to view details. However, the conventional tokenization may not be adequately full proof.

Figure 16:
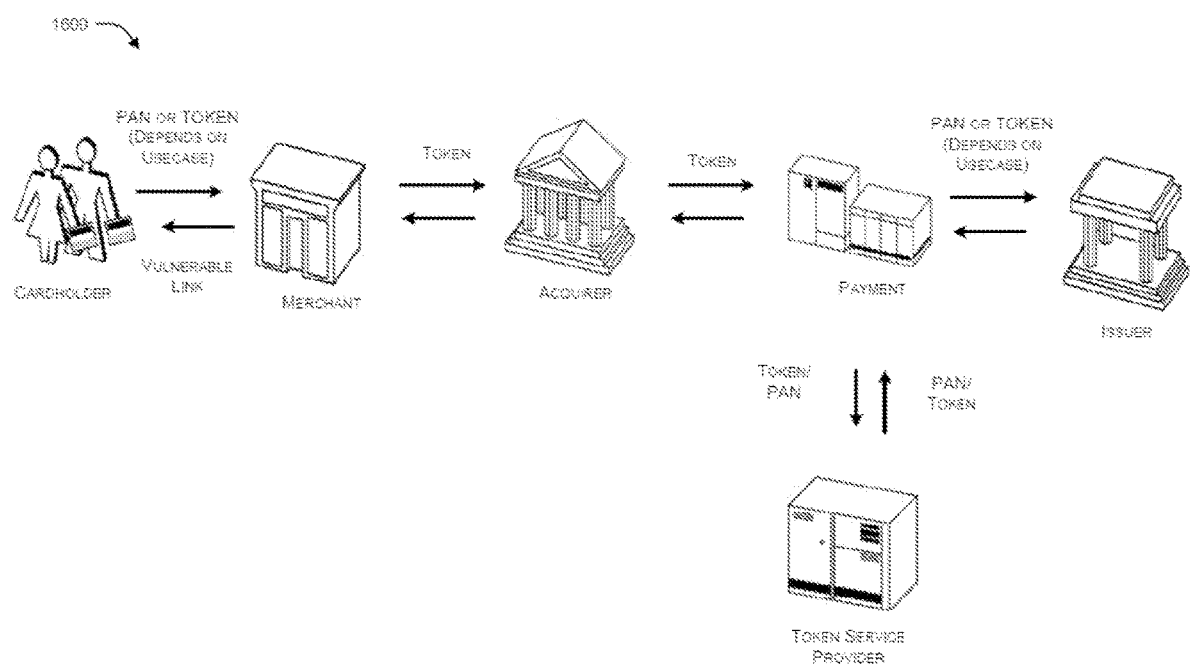
FIG. 16 illustrates an exemplary representation (1600) showing a typical tokenization network based system, in accordance with an embodiment of the present disclosure.

FIG. 16 illustrates a representation (1600) showing a typical tokenization network based system, in accordance with an embodiment of the present disclosure. As shown, user front facing interfaces may be built on various third party APIs and the security aspects are standardized. All interfaces may use TLS with only server authentication and also custom end-to-end algorithm where keys are often symmetric as there is no mechanism to use secure asymmetric key pairs in standard system (smart phone or PC). However, PKI enabled SIM card based solution of the present disclosure may be effectively used in tokenization to improve the security of the implementation. This may add a high degree of security layer in e-commerce service at front facing user API to participate (for example, cardholder to merchant and acquirer communication) in tokenization and to secure the card sensitive data. The same PKI-SIM can be used to create independent "token service provider" with complete eco-system consisting of authentication, authorization, non-repudiation with end-to-end encryption.

Apart from financial security based applications, the implementation of the present disclosure may also be used in several different applications such as, for example, IoT devices based systems. The existing hardware infrastructure in IoT may be limited and often not capable to support PKI ecosystem. Although cloud solutions are providing partial solution to enable PKI support with cloud interface, but there is a huge gap especially in terms of the cryptographic hardware and end-to-end encryption. The PKI-SIM based system of the present disclosure may enable to fulfil the gap where only security features may be utilized without using communication considering the fact that communication channel still can be used for device management or PKI configuration update.

Figure 17:
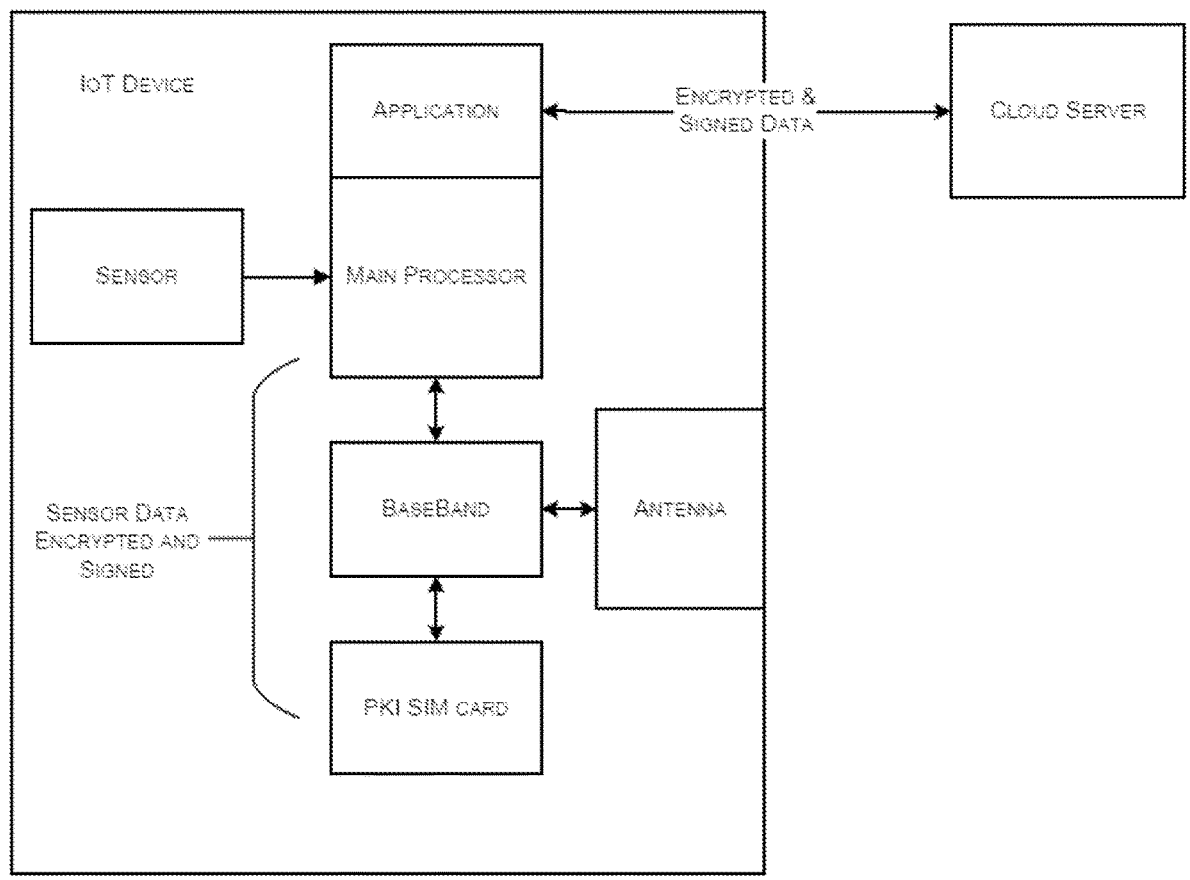
FIG. 17 illustrates an exemplary representation (1700) showing implementation of PKI enabled SIM in Internet of Things (IoT) applications, in accordance with an embodiment of the present disclosure.

FIG. 17 illustrates a representation (1700) showing implementation of PKI enabled SIM in IoT applications, in accordance with an embodiment of the present disclosure. As shown in FIG. 17, the PKI-SIM may be used as a root of trust in IoT Device. In an example, using the PKI-SIM when coupled with device ID/device information, it can act as root of trust for various purposes such as, for example, authentication of device, wherein each client node can be authenticated independently. The PKI enabled SIM may also be used for signing and encrypting sensory data, wherein all data from sensor node can be end-to-end encrypted. The PKI enabled SIM may also be used for device management, wherein individual IoT nodes can be controlled with all parameters such as configuration, firmware update, device enable/disable, and other such purposes.

Further, in IoT implementation, although PKI may be a trusted platform in terms of security, however, the standard digital certificate (for example, x509 format) size (about 1 KB) may be a serious concern for IoT devices. In an embodiment, the PKI-enabled SIM may enable inclusion of a light-weight PKI environment. By using the PKI-enabled SIM solution, the certificate format may be modified without compromising security level, and also the certificate size may be reduced to less than 500 Bytes which can be used as device authentication.

The PKI enabled SIM based solution may also be used in other applications such as, for example, in secure SMS based messaging and other such implementation. It may be known that OTP or SMS has been extensively used as the second factor authentication method in many applications.

Figure 18:
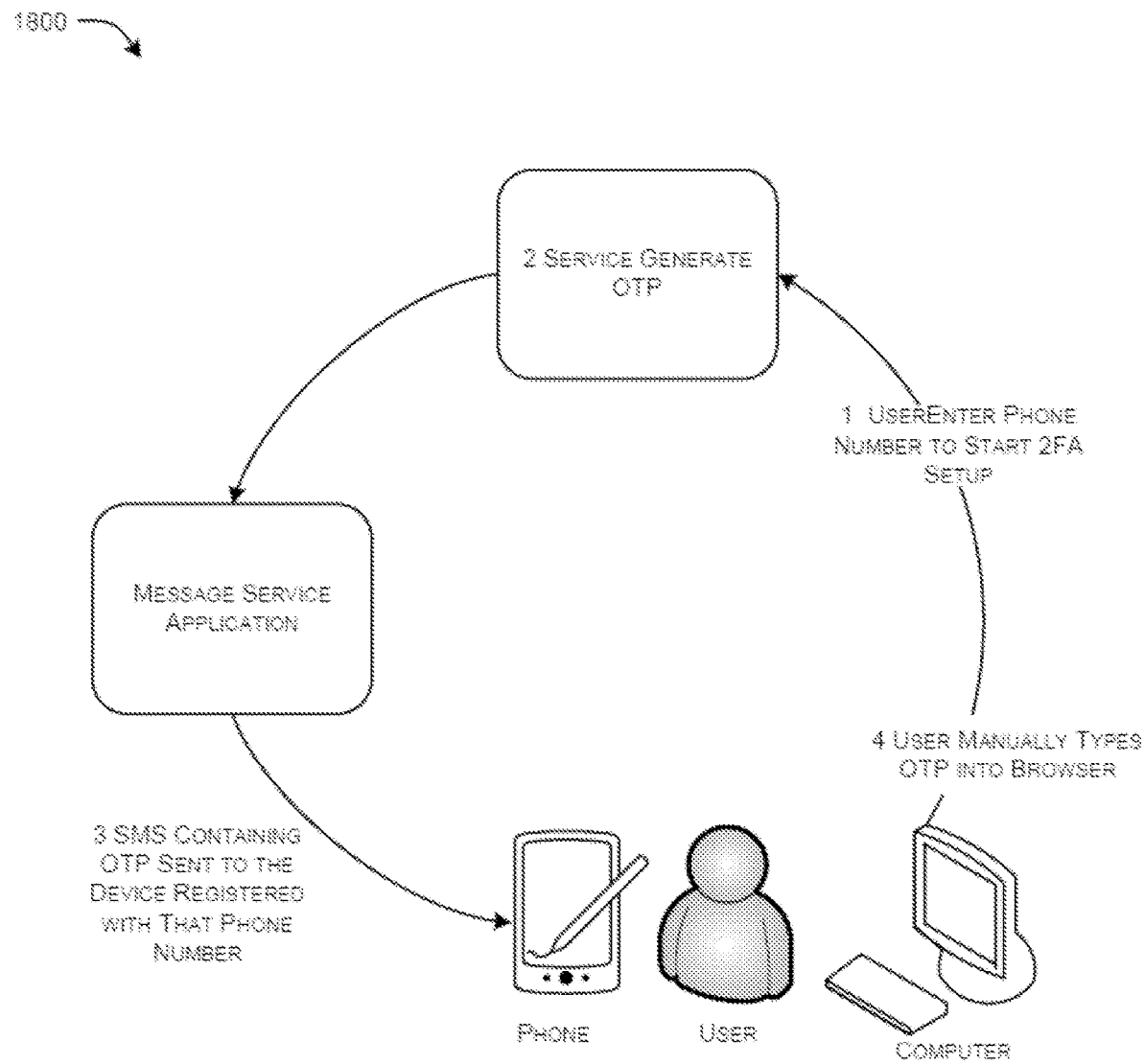
FIG. 18 illustrates an exemplary representation (1800) showing a conventional one-time password (OTP) based implementation.

FIG. 18 illustrates a representation (1800) showing a conventional OTP based implementation. The OTP based methods provide more secure digital transactions between users and service providers where a separate channel (OTP) is used for user authentication. However, the OTP method may be prone to various attacks such as SIM swap attack, wherein an attacker can get access to SIM profile and thus has access to all the OTP/SMS sent to a number or an attacker has access of the mobile phone and may be able to use it. This may also enable access to other sensitive information such as contacts, emails, stored passwords, and other such sensitive information. In conventional methods, another messaging solution has been used to address the above-mentioned security problems, wherein SMS with encrypted OTP may be read by an application which further communicates with the SIM for decryption.

Figure 19:
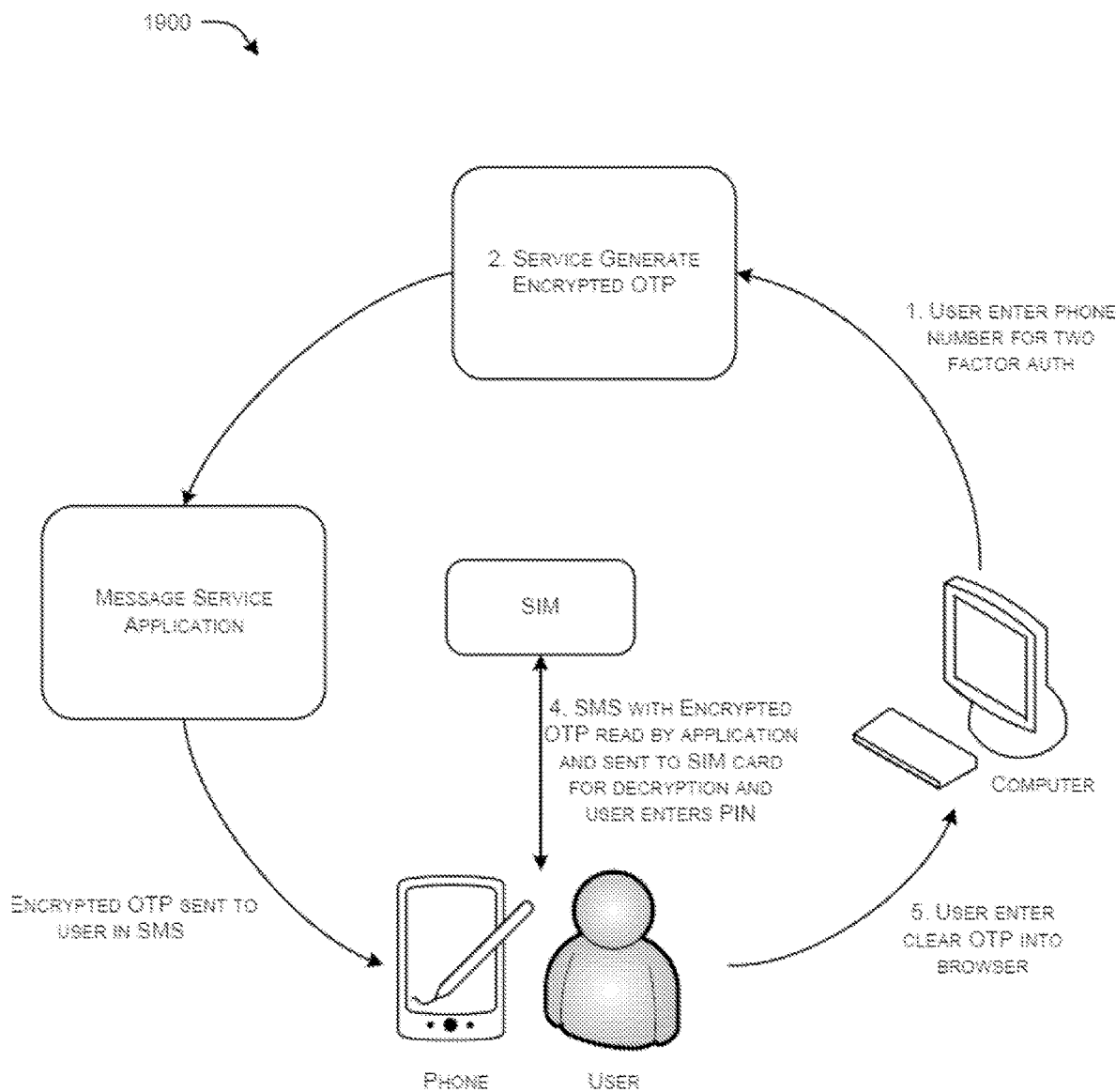
FIG. 19 illustrates an exemplary representation (1900) showing a conventional secure messaging mechanism.

FIG. 19 illustrates a representation (1900) showing a conventional secure messaging mechanism. As shown in FIG. 19, in secure messaging, the OTP may be sent as encrypted to the user's mobile phone and based on the scheme implemented (as mentioned below), OTP may be decrypted by SIM card and presented to the user for further use in two factor authentication. The present disclosure provides a more reliable solution that uses PKI-SIM based technique.

Figure 20:
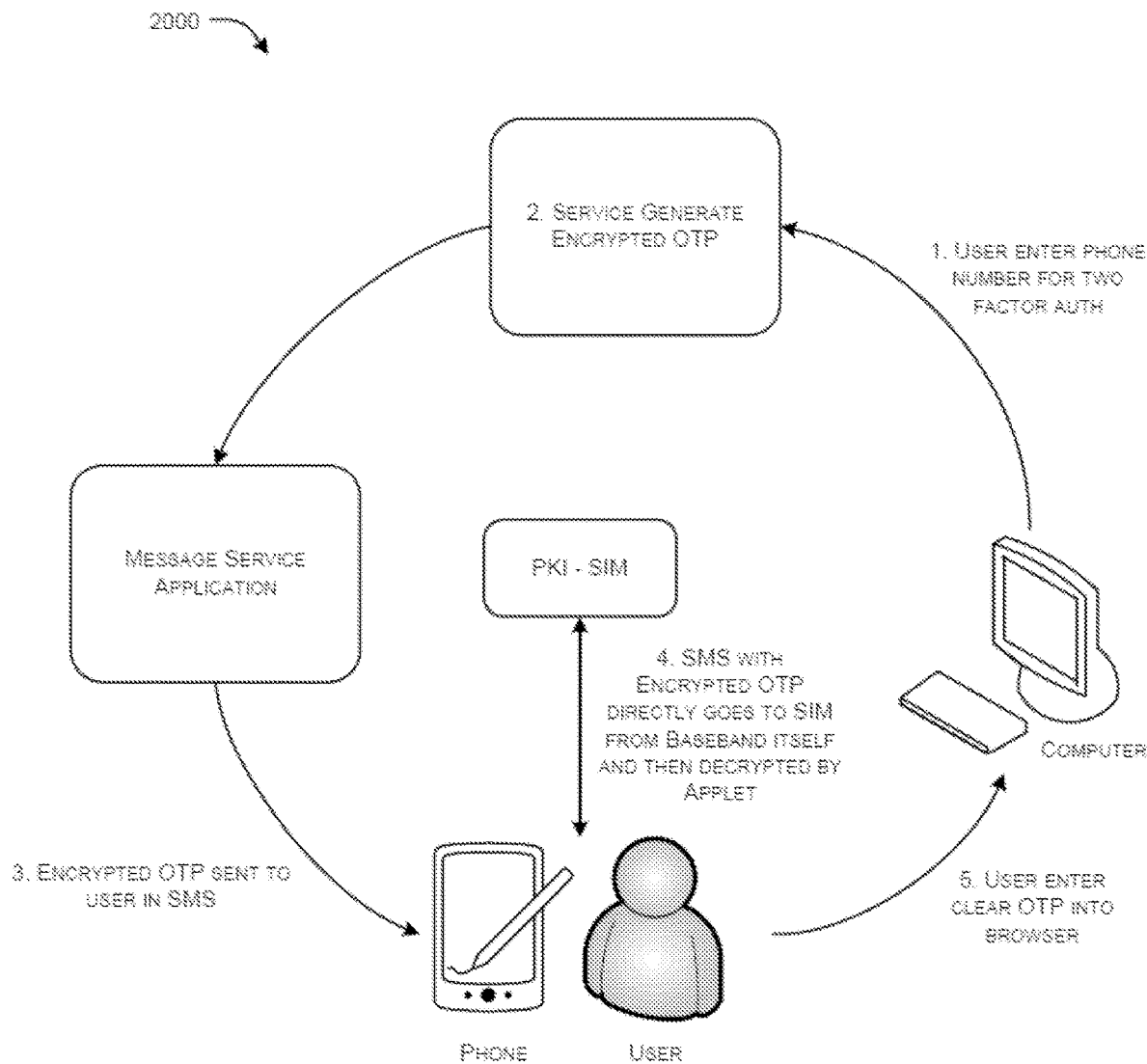
FIG. 20 illustrates an exemplary representation (2000) showing implementation of PKI enabled SIM in secure messaging, in accordance with an embodiment of the present disclosure.

FIG. 20 illustrates a representation (2000) showing implementation of PKI enabled SIM in secure messaging, in accordance with an embodiment of the present disclosure. As shown in FIG. 20, SMS with encrypted OTP may be sent from baseband to SIM for decryption by SIM applet. In this technique, instead of an application (message service/application of OS/mobile phone manufacturer) as indicated in FIG. 19, encrypted OTP is directly sent from baseband to SIM card and then SIM card applet may take care of decryption and presentation of clear OTP to user.

In addition to the above-mentioned applications, the present disclosure may also be used for several use-cases that may implement the middleware APIs. In an embodiment, the PKI enabled SIM may be used for signing of pdf documents.

Figure 21:
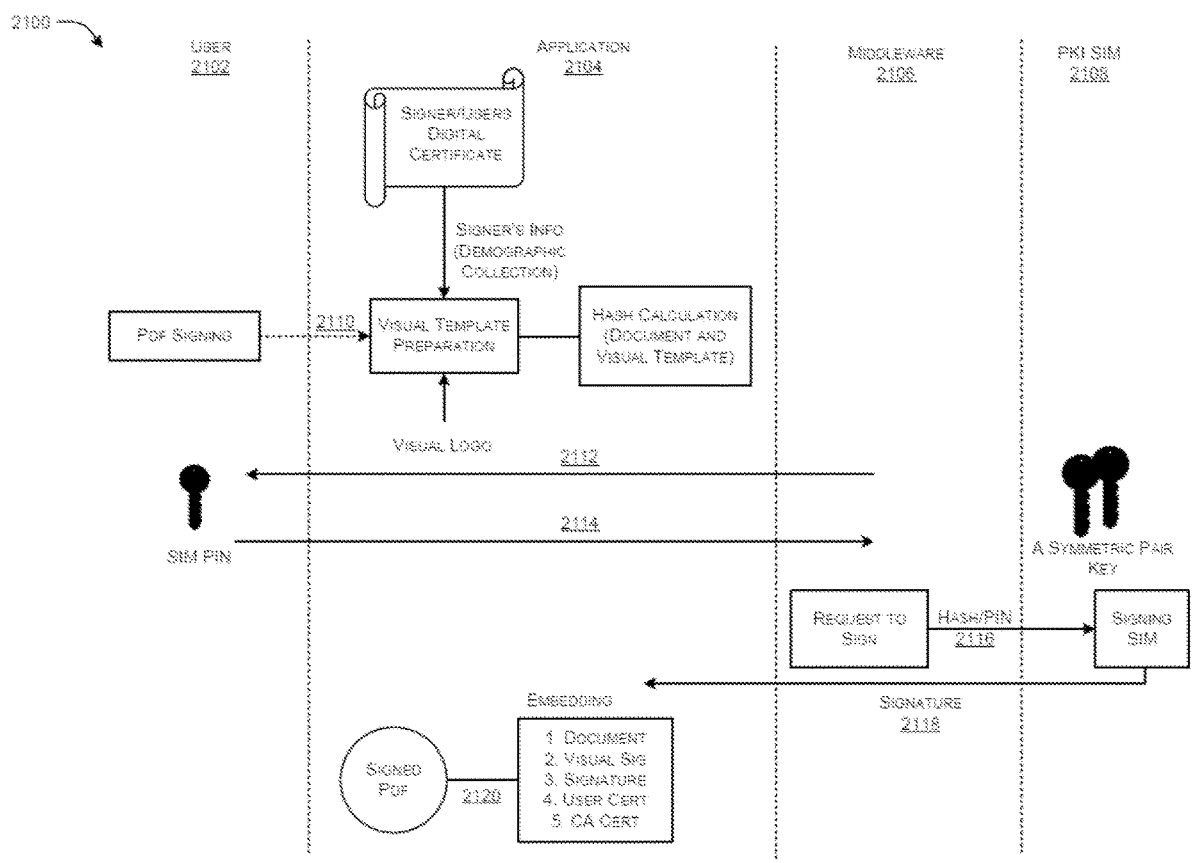
FIG. 21 illustrates an exemplary representation (2100) showing implementation of PKI enabled SIM for digital signing of a pdf document, in accordance with an embodiment of the present disclosure.

FIG. 21 illustrates a representation (2100) showing implementation of PKI enabled SIM for digital signing of a pdf document, in accordance with an embodiment of the present disclosure. As shown in FIG. 21, at step 2110, a user (2102) may request for pdf signing to an application (2104). The application (2104) may collect the user's digital certificate details and signer's information (demographic details) to prepare a visual template preparation. The application (2104) may then calculate hash for the corresponding document and visual template. At 2112, middleware (2106) may request for SIM PIN, which may be shared at 2114, based on which, at 2116, the middleware (2106) may request the PKI-SIM (2108) to enable signing the pdf, by sharing the hash and PIN. At 2118 and 2120, the signed pdf may be obtained along with other embedded certificates and information.

In an embodiment, the PKI enabled SIM may be used for hybrid encryption/decryption processes.

Figure 22:
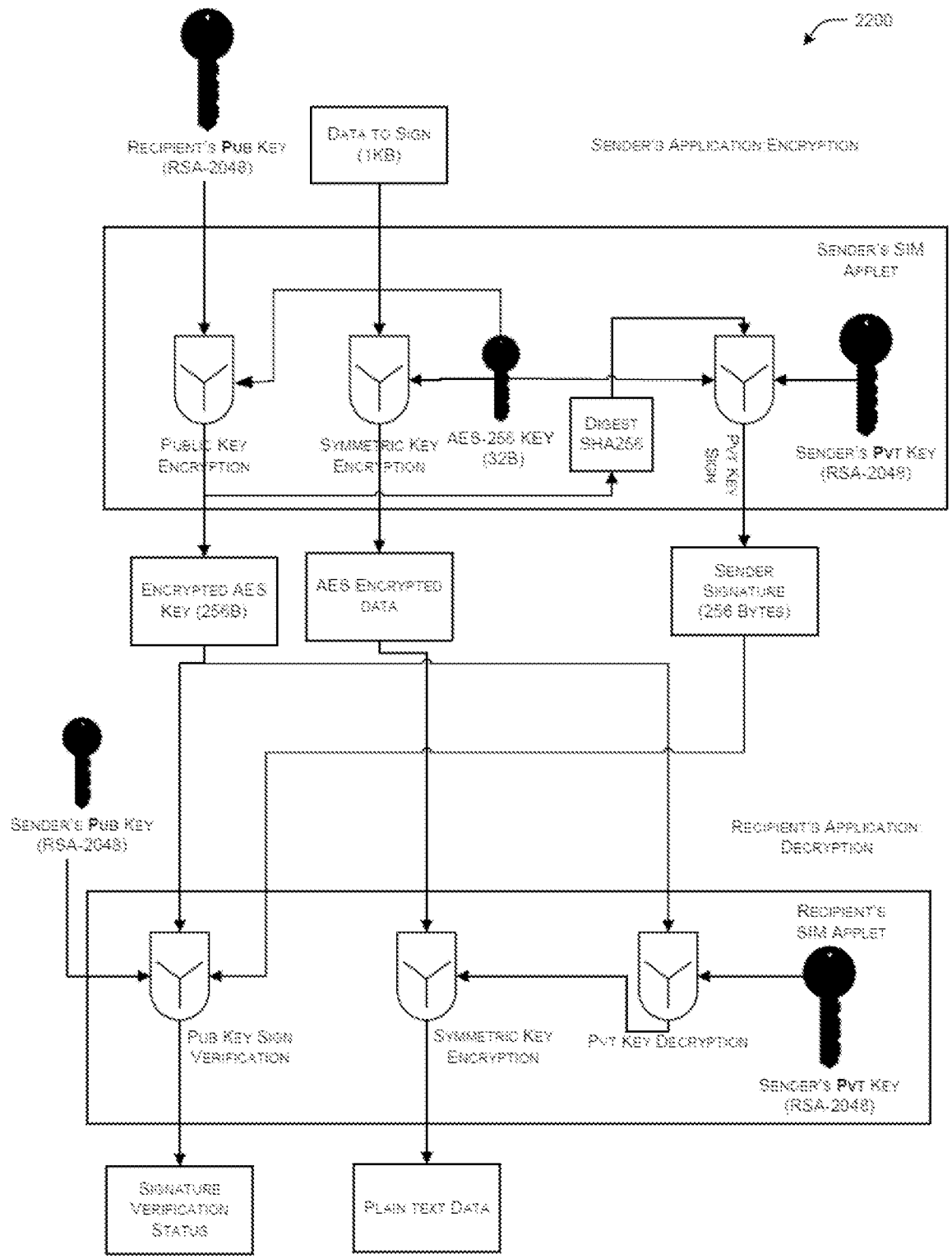
FIG. 22 illustrates an exemplary representation (2200) showing implementation of PKI enabled SIM in a hybrid encryption/decryption technique, in accordance with an embodiment of the present disclosure.

FIG. 22 illustrates a representation (2200) showing implementation of PKI enabled SIM in a hybrid encryption/decryption technique, in accordance with an embodiment of the present disclosure. As shown in FIG. 22, data to be shared may be encrypted at sender's device including PKI-SIM (sender's SIM applet) by using sender's private key. Further, the encrypted data may be decrypted at the recipient's device including PKI-SIM (recipient's SIM applet) by using the sender's public key.

Figure 23:
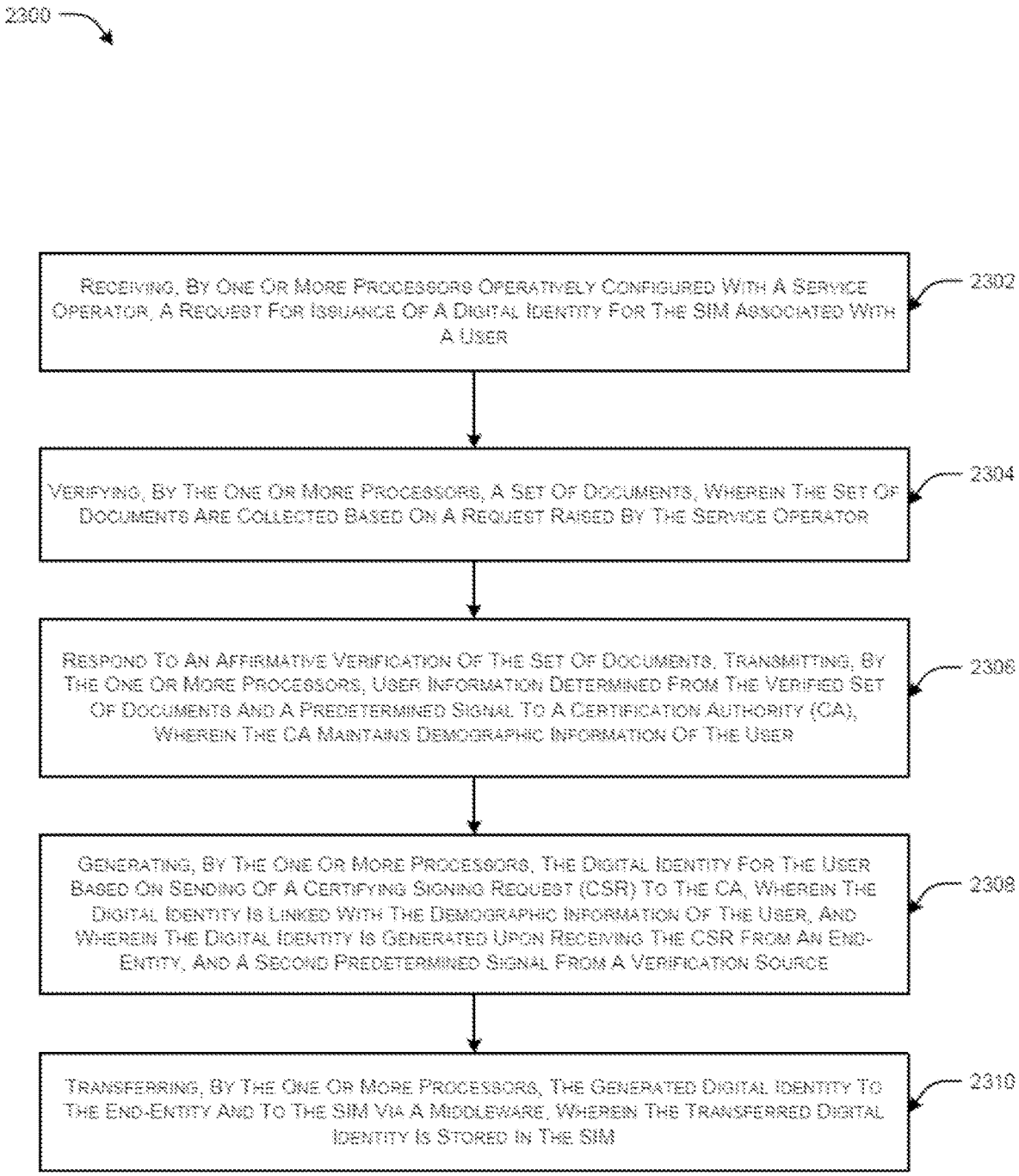
FIG. 23 illustrates an example method (2300) for providing PKI enabled SIM for digital identity management, in accordance with an embodiment of the present disclosure.

FIG. 23 illustrates an example method (2300) for providing PKI enabled SIM for digital identity management, in accordance with an embodiment of the present disclosure. At step 2302, the method (2300) may include receiving a request for issuance of a digital identity for the SIM associated with a user, where a service operator issues the digital identity upon receiving a consent from a CA.

At step 2304, the method (2300) includes verifying a set of documents. The set of documents are collected based on a request raised by the service operator. The set of documents are collected using at least one of an online medium and an offline medium.

Responsive to an affirmative verification of the set of documents, at step 2306, the method (2300) includes transmitting user information determined from the verified set of documents and a predetermined signal to the CA, where the CA maintains demographic information of the user.

In response to sending of a CSR to the CA, the method (2300) may, at step 2308, include generating the digital identity for the user. The digital identity is linked with demographic information of the user. In addition, the digital identity is generated upon receiving the CSR from an end-entity, and a second predetermined signal from a verification source. At step 2310, the method (2300) also includes transferring the generated digital identity to the end-entity and to the SIM via a middleware. The middleware is a set of instructions secured by digital signatures of the CA.

Further, at step 2310, the transferred digital identity is stored in the SIM. The digital identity is used to authenticate the user using the stored digital identity in the SIM. The stored digital identity is deleted upon the user issuing a request to revoke the generated digital identity.

Figure 24:
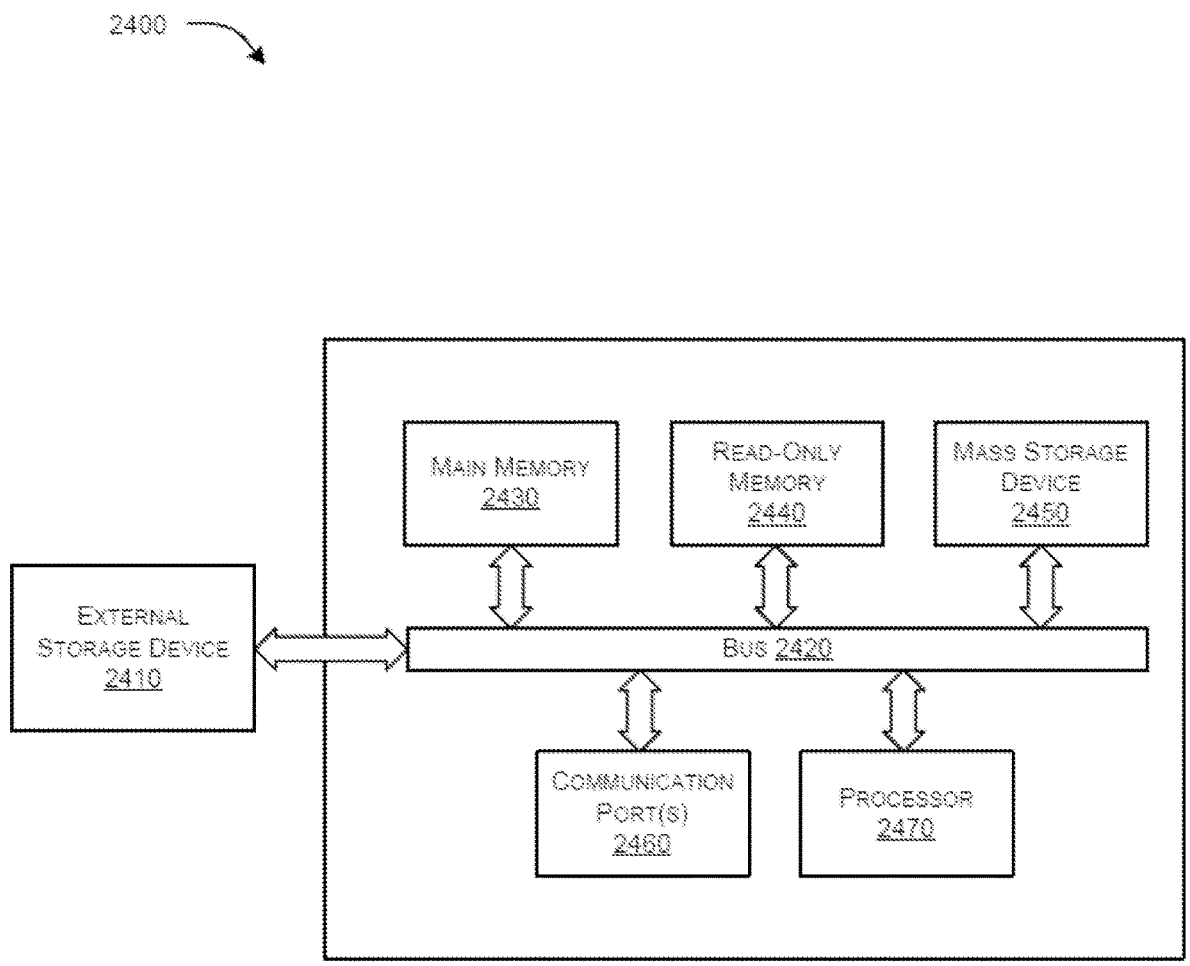
FIG. 24 illustrates an exemplary computer system (2400) in which or with which embodiments of the present disclosure may be implemented.

FIG. 24 illustrates an exemplary computer system (2400) in which or with which embodiments of the present disclosure may be utilized. As shown in FIG. 24, the computer system (2400) may include an external storage device (2410), a bus (2420), a main memory (2430), a read-only memory (2440), a mass storage device (2450), communication port(s) (2460), and a processor (2470). A person skilled in the art will appreciate that the computer system (2400) may include more than one processor and communication ports. The processor (2470) may include various modules associated with embodiments of the present disclosure. The communication port(s) (2460) may be any of an RS-232 port for use with a modem-based dialup connection, a 10/100 Ethernet port, a Gigabit or 10 Gigabit port using copper or fiber, a serial port, a parallel port, or other existing or future ports. The communication port(s) (2460) may be chosen depending on a network, such a Local Area Network (LAN), Wide Area Network (WAN), or any network to which the computer system (2400) connects. The main memory (2430) may be random access memory (RAM), or any other dynamic storage device commonly known in the art. The read-only memory (2440) may be any static storage device (s) including, but not limited to, a Programmable Read Only Memory (PROM) chips for storing static information e.g., start-up or basic input/output system (BIOS) instructions for the processor (2470). The mass storage device (2450) may be any current or future mass storage solution, which may be used to store information and/or instructions.

The bus (2420) communicatively couples the processor (2470) with the other memory, storage, and communication blocks. The bus (2420) can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor (2470) to the computer system (2400).

Optionally, operator and administrative interfaces, e.g. a display, keyboard, and a cursor control device, may also be coupled to the bus (2420) to support direct operator interaction with the computer system (2400). Other operator and administrative interfaces may be provided through network connections connected through the communication port(s) (2460). In no way should the aforementioned exemplary computer system (2400) limit the scope of the present disclosure.

Thus, the present disclosure provides a unique solution in form of various possible implementations of the PKI enabled SIM in identity management. In an embodiment, an overall implementation of PKI enabled SIM with an MNO operable framework may provide for existing telecommunication entities to enable efficient verification/KYC verification and several advantages, as summarized.

Submission of redundant documents: For each kind of service, a user may need to produce documents each time (with minor alteration or deviation). If the repository is accessed between various services, the effort of the user shall be reduced which will bring higher customer satisfaction.

Maintenance of repository: Redundant copies of the same data may be maintained in multiple repositories designated for different services. The repository may be a physical or digital repository. Accessing the same data for multiple services may reduce the repository size and space hence leading to a lower maintenance effort and cost.

Processing Time: Processing time for document or background verification (during KYC) needs manual intervention. The consent transfer mechanism for the same type and redundant document verification for different services shall reduce time significantly.

Merging of service providers: Often, different services may be managed by independent authority. In this process, the MNO may be designated to provide RA service too.

Security Control: Conventionally, digital certificates and sensitive components may be stored in a USB dongle. Often, USB dongles are provided by a third party. On the other side, SIM cards are handled (accountability) by MNO. Merging PKI components inside SIM cards may provide a possible option to reduce dependency on USB dongles.

Close network: The entire network may be tightly controlled and closed with provision of participation of a central body. There may be no leakage or routing of data through any external device or server.

Several other advantages may be realized from the embodiments of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides a system and a method to facilitate public key infrastructure (PKI) enabled subscriber identification module (SIM) for identity management.

The present disclosure provides a system and a method to provide an effective system and a method that can facilitate identity management in various digital transactions/interactions between individuals and/or machines/devices.

The present disclosure provides a system and a method to facilitate identity management in PKI implementation.

The present disclosure provides a system and a method to avoid the need to share/store sensitive information in third party servers or other insecure hardware/service.

The present disclosure provides a system and method to significantly improve security, while minimizing system dependency/costs in implementation of PKI based framework for identity management.

We claim:

1. A system for Public Key Infrastructure (PKI) enabled Subscriber Identification Module (SIM) for digital identity management, the system comprising:
one or more processors; and
a memory operatively coupled to the one or more processors, wherein the memory comprises processor-executable instructions, which on execution, cause the one or more processors to:
receive a request for issuance of a digital identity for the SIM associated with a user;
verify a set of documents, wherein the set of documents are collected based on a request raised by a service operator;
in response to an affirmative verification of the set of documents, transmit user information determined from the verified set of documents and a predetermined signal to a Certification Authority (CA), wherein the CA maintains demographic information of the user; generate the digital identity for the user based on a Certifying Signing Request (CSR), wherein the digital identity is linked with the demographic information of the user, and wherein the digital identity is generated upon receiving the CSR from an end-entity, and a second predetermined signal from a verification source; and
transfer the generated digital identity to the end-entity and to the SIM via a middleware, wherein the transferred digital identity is stored in the SIM, wherein the SIM transmits, via a first link, information to a remote server, and to a predetermined application via a second link, and wherein the information is relayed to the CA.

2. The system as claimed in claim 1, wherein the memory comprises processor-executable instructions, which on execution, cause the one or more processors to authenticate the user using the stored digital identity in the SIM, and wherein the stored digital identity is deleted upon the user issuing a request to revoke the generated digital identity.

3. The system as claimed in claim 1, wherein the middleware is a set of instructions secured by digital signatures of the CA.

4. The system as claimed in claim 1, wherein the memory comprises processor-executable instructions, which on execution, cause the one or more processors to prepare a CSR template for the CSR by creating an asymmetric key pair inside the SIM, and perform an asymmetric encryption of the asymmetric key pair.

5. The system as claimed in claim 1, wherein the memory comprises processor-executable instructions, which on execution, cause the one or more processors to collect the set of documents using at least one of an online medium and an offline medium.

6. The system as claimed in claim 1, wherein the SIM comprises a secured set of instructions that are accessed remotely via an Over-The-Air (OTA) server.

7. The system as claimed in claim 1, wherein the service operator acts as a Registration Authority (RA) and is connected to a sub-CA or a root CA, and wherein the user communicates with the service operator through at least one of the sub-CA and the root CA.

8. The system as claimed in claim 1, wherein the SIM comprises a Radio Interface Layer (RIL) and Operating System (OS) Application Programming Interface (API) block, a Global Platform (GP) communication security block, and an Application Protocol Data Unit (APDU) block.

9. The system as claimed in claim 1, wherein the SIM comprises one or more of security key pairs and digital certificates for establishing the digital identity.

10. The system as claimed in claim 1, wherein the service operator issues the digital identity upon receiving a consent from the CA.

11. The system as claimed in claim 1, wherein the memory comprises processor-executable instructions, which on execution, cause the one or more processors to send the CSR to the CA, wherein the CSR is issued upon the user providing a Personal Identification Number (PIN), and wherein the CSR is associated with the request for the issuance of the digital identity.

12. A method for Public Key Infrastructure (PKI) enabled Subscriber Identification Module (SIM) for digital identity management, the method comprising:
receiving, by one or more processors, a request for issuance of a digital identity for the SIM associated with a user;
verifying, by the one or more processors, a set of documents, wherein the set of documents are collected based on a request raised by a service operator;
in response to an affirmative verification of the set of documents, transmitting, by the one or more processors, user information determined from the verified set of documents and a predetermined signal to a Certification Authority (CA), wherein the CA maintains demographic information of the user;
generating, by the one or more processors, the digital identity for the user based on a Certifying Signing Request (CSR), wherein the digital identity is linked with the demographic information of the user, and wherein the digital identity is generated upon receiving the CSR from an end-entity, and a second predetermined signal from a verification source;
transferring, by the one or more processors, the generated digital identity to the end-entity and to the SIM via a middleware, wherein the transferred digital identity is stored in the SIM; and
transmitting, by the SIM via a first link, information to a remote server, and to a predetermined application via a second link, wherein the information is relayed to the CA.

13. The method as claimed in claim 12, comprising authenticating, by the one or more processors, the user using the stored digital identity in the SIM, and wherein the stored digital identity is deleted upon the user issuing a request to revoke the generated digital identity.

14. The method as claimed in claim 12, comprising preparing, by the one or more processors, a CSR template for the CSR by creating an asymmetric key pair inside the SIM, and performing, by the one or more processors, an asymmetric encryption of the asymmetric key pair.

15. The method as claimed in claim 12, comprising collecting, by the one or more processors, the set of documents using at least one of: an online medium and an offline medium.

16. The method as claimed in claim 12, wherein the service operator acts as a Registration Authority (RA) and is connected to a sub-CA or a root CA, and wherein the user communicates with the service operator through at least one of the sub-CA and the root CA.

17. A user equipment (UE) for Public Key Infrastructure (PKI) enabled Subscriber Identification Module (SIM) for digital identity management, said UE comprising:

one or more processors communicatively coupled to a system, wherein the system comprises a processor configured to:

receive a request for issuance of a digital identity for the SIM associated with a user;

verify a set of documents, wherein the set of documents are collected based on a request raised by a service operator;

in response to an affirmative verification of the set of documents, transmit user information determined from the verified set of documents and a predetermined signal to a Certification Authority (CA), wherein the CA maintains demographic information of the user;

generate the digital identity for the user based on a Certifying Signing Request (CSR), wherein the digital identity is linked with the demographic information of the user, and wherein the digital identity is generated upon receiving the CSR from an end-entity, and a second predetermined signal from a verification source; and transfer the generated digital identity to the end-entity and to the STM via a middleware, wherein the transferred digital identity is stored in the SIM, wherein the SIM transmits, via a first link, information to a remote server, and to a predetermined application via a second link, and wherein the information is relayed to the CA.

18. A Subscriber Identification Module (SIM) card operatively configured for a user equipment (UE) for digital identity management, said SIM comprising:

one or more processors; and a system integrated within the SIM and communicatively coupled to the one or more processors, wherein the system comprises the one or more processors configured to:

receive a request for issuance of a digital identity for the SIM associated with a user;

verify a set of documents, wherein the set of documents are collected based on a request raised by a service operator;

in response to an affirmative verification of the set of documents, transmit user information determined from the verified set of documents and a predetermined signal to a Certification Authority (CA), wherein the CA maintains demographic information of the user;

generate the digital identity for the user based on a Certifying Signing Request (CSR), wherein the digital identity is linked with the demographic information of the user, and wherein the digital identity is generated upon receiving the CSR from an end-entity, and a second predetermined signal from a verification source; and transfer the generated digital identity to the end-entity and to the SIM via a middleware, wherein the transferred digital identity is stored in the SIM, wherein the SIM transmits, via a first link, information to a remote server, and to a predetermined application via a second link, and wherein the information is relayed to the CA.

* * * * *